US012706080B2

(12) United States Patent
Chen et al.

(10) Patent No.: US 12,706,080 B2
(45) Date of Patent: Aug. 11, 2026

(54) END-TO-END NATURAL AND CONTROLLABLE EMOTIONAL SPEECH SYNTHESIS METHODS

(71) Applicant: HANGZHOU TONGHUASHUN DATA PROCESSING CO., LTD., Zhejiang (CN)

(72) Inventors: Ming Chen, Hangzhou (CN); Xinkang Xu, Hangzhou (CN); Xinhui Hu, Hangzhou (CN); Xudong Zhao, Hangzhou (CN)

(73) Assignee: HANGZHOU TONGHUASHUN DATA PROCESSING CO., LTD., Hangzhou (CN)

( * ) Notice: Subject to any disclaimer, the term of this patent is extended or adjusted under 35 U.S.C. 154(b) by 331 days.

(21) Appl. No.: 18/342,701

(22) Filed: Jun. 27, 2023

(65) Prior Publication Data

US 2024/0005905 A1 Jan. 4, 2024

(30) Foreign Application Priority Data

Jun. 29, 2022 (CN) ........................ 202210745256.X

(51) Int. Cl.
*G10L 13/02* (2013.01)
*G10L 25/30* (2013.01)
*G10L 25/63* (2013.01)

(52) U.S. Cl.
CPC .............. *G10L 13/02* (2013.01); *G10L 25/30* (2013.01); *G10L 25/63* (2013.01)

(58) Field of Classification Search
CPC ......... G10L 13/02; G10L 25/30; G10L 25/63; G10L 13/027; G10L 13/033; G06F 40/30
See application file for complete search history.

(56) References Cited

U.S. PATENT DOCUMENTS

2019/0172443 A1* 6/2019 Shechtman ........... G10L 13/047
2020/0342852 A1* 10/2020 Kim ........................ G06F 40/40
(Continued)

FOREIGN PATENT DOCUMENTS

CN 108647191 A 10/2018
CN 108962217 A 12/2018
(Continued)

OTHER PUBLICATIONS

Yi et al., "Msemotts: Multi-scale emotion transfer, prediction, and control for emotional speech synthesis." IEEE/ACM Transactions on Audio, Speech, and Language Processing 30 (2022): 853-864. (Year: 2022).*

(Continued)

*Primary Examiner* — Bhavesh M Mehta
*Assistant Examiner* — Jangwoen Lee
(74) *Attorney, Agent, or Firm* — METIS IP LLC

(57) ABSTRACT

The present disclosure provides acoustic model training methods and systems, and speech synthesis methods and systems. An acoustic model training method may include obtaining a plurality of training samples. Each of the plurality of training samples may include a sample text input, a sample emotion label corresponding to the sample text input, and a sample reference mel spectrum corresponding to the sample text input. The acoustic model training method may include inputting the plurality of training samples into a target model. The target model may include the acoustic model and an auxiliary module. The acoustic model training method may further include iteratively adjusting at least one model parameter of the acoustic model based on a loss target.

20 Claims, 13 Drawing Sheets

(56) References Cited

U.S. PATENT DOCUMENTS

| | | | | |
|---|---|---|---|---|
| 2021/0287657 | A1* | 9/2021 | Deng | G06F 40/30 |
| 2022/0020356 | A1 | 1/2022 | Wang et al. | |
| 2022/0076657 | A1 | 3/2022 | Wang et al. | |
| 2022/0188456 | A1 | 6/2022 | Pang et al. | |
| 2023/0178067 | A1* | 6/2023 | Wang | G10L 13/047<br>704/259 |

FOREIGN PATENT DOCUMENTS

| | | | | | |
|---|---|---|---|---|---|
| CN | 109933664 | A | | 6/2019 | |
| CN | 110379409 | A | | 10/2019 | |
| CN | 111951778 | A | | 11/2020 | |
| CN | 112289299 | A | * | 1/2021 | G10L 13/02 |
| CN | 112309366 | A | * | 2/2021 | G10L 13/08 |
| CN | 112382272 | A | | 2/2021 | |
| CN | 112562634 | A | | 3/2021 | |
| CN | 112786009 | A | | 5/2021 | |
| CN | 112908294 | A | | 6/2021 | |
| CN | 113327572 | A | | 8/2021 | |
| CN | 113409762 | A | | 9/2021 | |
| CN | 113539236 | A | | 10/2021 | |
| CN | 113257225 | B | | 11/2021 | |
| CN | 113658577 | A | * | 11/2021 | G10L 13/08 |
| CN | 113707125 | A | | 11/2021 | |
| CN | 114220415 | A | | 3/2022 | |
| CN | 114242033 | A | | 3/2022 | |
| CN | 114333782 | A | | 4/2022 | |
| WO | 2021123792 | A1 | | 6/2021 | |
| WO | 2022046228 | A1 | | 3/2022 | |
| WO | 2022118432 | A1 | | 6/2022 | |

OTHER PUBLICATIONS

Kei Akuzawa et al., Expressive Speech Synthesis via Modeling Expressions with Variational Autoencoder, Interspeech 2018, 2018, 5 pages.

Wei, Ping et al., Deep Voice 3: Scaling Text-to-Speech with Convolutional Sequence Learning, ICLR 2018, 2018, 16 pages.

First Office Action in Chinese Application No. 202210745256.X mailed on Aug. 10, 2022, 30 pages.

Heejin Choi et al., Multi-speaker Emotional Acoustic Modeling for CNN-based Speech Synthesis, ICASSP 2019—2019 IEEE International Conference on Acoustics, Speech and Signal Processing, 2019, 5 pages.

* cited by examiner

END-TO-END NATURAL AND CONTROLLABLE EMOTIONAL SPEECH SYNTHESIS METHODS

CROSS-REFERENCE TO RELATED APPLICATION

This application claims priority of Chinese Patent Application No. 202210745256. X, filed on Jun. 29, 2022, the contents of which are entirely incorporated herein by reference.

TECHNICAL FIELD

The present disclosure relates to the technical field of artificial intelligence, in particular to methods and systems for training an acoustic model, and speech synthesis methods.

BACKGROUND

With the development of machine learning, speech synthesis technology is becoming more and more mature. However, there are still many problems in the existing speech synthesis technology, for example, the synthesized speech is blunt and unnatural, and lacks rich emotional expressions, etc. Therefore, it is desirable to provide speech synthesis methods to improve the naturalness and emotion richness of a robot's speech.

SUMMARY

An aspect of the present disclosure provides a method for training an acoustic model. The method may include obtaining a plurality of training samples. Each of the plurality of training samples may include a sample text input, a sample emotion label corresponding to the sample text input, and a sample reference mel spectrum corresponding to the sample text input. The method may include inputting the plurality of training samples into a target model. The target model may include the acoustic model and an auxiliary module. The method may further include iteratively adjusting at least one model parameter of the acoustic model based on a loss target.

In some embodiments, the acoustic model may include an encoder and an emotion embedding vector determination module. The encoder may be configured to determine a text sequence vector of the sample text input. The emotion embedding vector determination module may be configured to determine a sample emotion embedding vector corresponding to the sample emotion label. The auxiliary module may include an unsupervised module configured to determine a sample reference style vector corresponding to the sample reference mel spectrum.

In some embodiments, the acoustic model may further include a vector processing module configured to determine a comprehensive emotion vector based on a sum of the sample emotion embedding vector and the sample reference style vector. The comprehensive emotion vector may be a character-level embedding vector.

In some embodiments, the acoustic model may further include a decoder configured to determine a sample prediction mel spectrum based on a cascade vector of the text sequence vector and the comprehensive emotion vector.

In some embodiments, the vector processing module may be further configured to determine a hidden state vector. The auxiliary module may further include an emotion classifier configured to determine a vector emotion category based on the hidden state vector.

In some embodiments, the acoustic model may further include a vector prediction module configured to determine a sample prediction style vector based on the text sequence vector.

In some embodiments, the auxiliary module may further include an emotion identification module configured to determine a prediction deep emotion feature corresponding to the sample prediction mel spectrum and a reference deep emotion feature corresponding to the sample reference mel spectrum.

In some embodiments, the loss target may include at least one of the following: a difference loss between the sample prediction style vector and the sample reference style vector; a classification loss of the vector emotion category; a difference loss between the sample prediction mel spectrum and the sample reference mel spectrum; or a difference loss between the prediction deep emotion feature and the reference deep emotion feature.

A further aspect of the present disclosure provides a system for training an acoustic model. The system may include at least one computer-readable storage medium including a set of instructions and at least one processing device communicating with the computer-readable storage medium. When executing the set of instructions, the at least one processing device may be configured to obtain a plurality of training samples. Each of the plurality of training samples may include a sample text input, a sample emotion label corresponding to the sample text input, and a sample reference mel spectrum corresponding to the sample text input. The at least one processing device may be configured to input the plurality of training samples into a target model. The target model may include the acoustic model and an auxiliary module. The at least one processing device may be further configured to iteratively adjust at least one model parameter of the acoustic model based on a loss target.

A still further aspect of the present disclosure provides a computer-readable storage medium storing computer instructions. When reading the computer instructions, a computer may implement a method for training an acoustic model. The method may include obtaining a plurality of training samples. Each of the plurality of training samples may include a sample text input, a sample emotion label corresponding to the sample text input, and a sample reference mel spectrum corresponding to the sample text input. The method may include inputting the plurality of training samples into a target model. The target model may include the acoustic model and an auxiliary module. The method may further include iteratively adjusting at least one model parameter of the acoustic model based on a loss target.

A still further aspect of the present disclosure provides a speech synthesis method. The speech synthesis method may include obtaining a text input and an emotion label corresponding to the text input; generating, by an acoustic model, a prediction mel spectrum corresponding to the text input based on the text input and the emotion label; and generating a prediction speech corresponding to the text input based on the prediction mel spectrum.

A still further aspect of the present disclosure provides a speech synthesis system. The speech synthesis system may include at least one computer-readable storage medium including a set of instructions and at least one processing device communicating with the computer-readable storage medium. When executing the set of instructions, the at least one processor is configured to obtain a text input and an emotion label corresponding to the text input; generate, by an acoustic model, a prediction mel spectrum corresponding to the text input based on the text input and the emotion label; and generate a prediction speech corresponding to the text input based on the prediction mel spectrum.

A still further aspect of the present disclosure provides a computer-readable storage medium storing computer instructions. When reading the computer instructions in the storage medium, a computer may implement a speech synthesis method. The speech synthesis method may include obtaining a text input and an emotion label corresponding to the text input; generating, by an acoustic model, a prediction mel spectrum corresponding to the text input based on the text input and the emotion label; and generating a prediction speech corresponding to the text input based on the prediction mel spectrum.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

Figure 1:
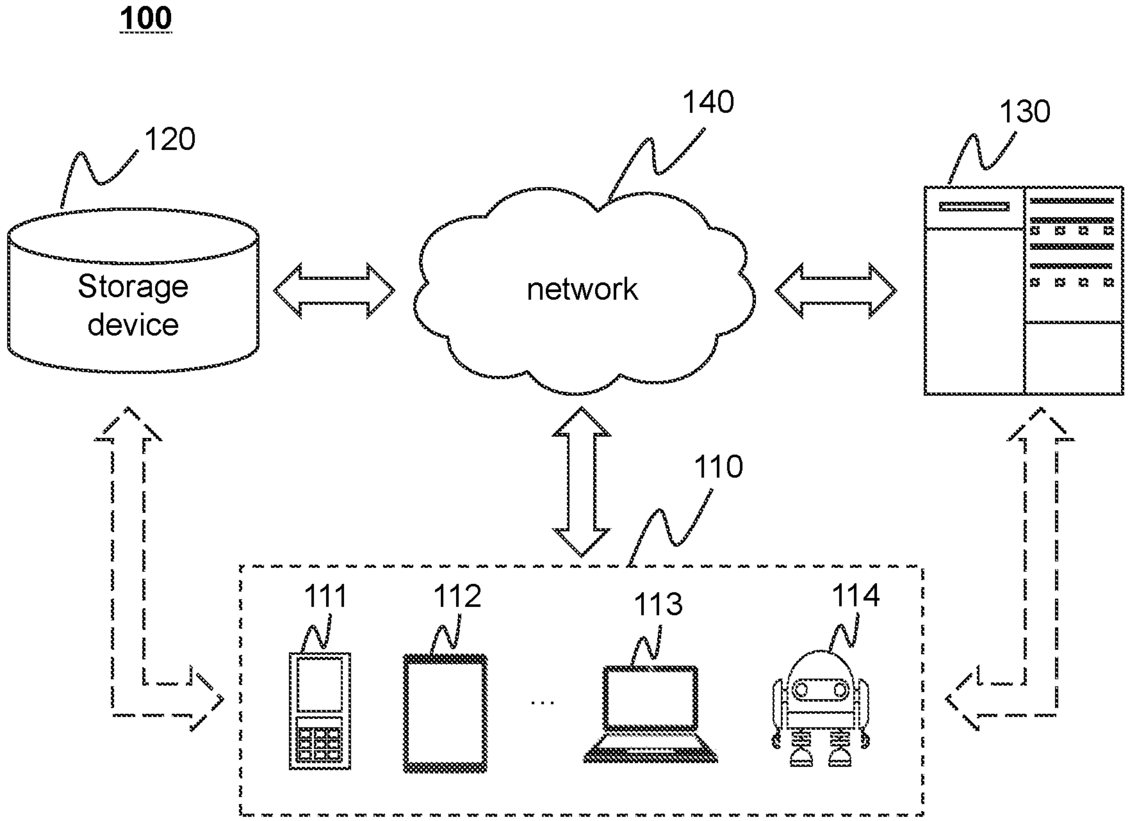
FIG. 1 is a schematic diagram illustrating an exemplary speech synthesis system according to some embodiments of the present disclosure.

FIG. 1 is a schematic diagram illustrating an exemplary speech synthesis system 100 according to some embodiments of the present disclosure.

In some embodiments, the speech synthesis system may be applied to man-machine dialogue, audio reading, speech assistant, speech translation, speech change, etc.

In some embodiments, the speech synthesis system 100 may include a terminal device 110, a storage device 120, a processing device 130, and a network 140. In some embodiments, various components of the speech synthesis system 100 may be connected to each other in various ways. For example, the terminal device 110 may be connected to the processing device 130 through the network 140 or directly (as indicated by the bi-directional arrow in dotted lines linking the terminal device 110 and the processing device 130). As another example, the storage device 120 may be connected to the processing device 130 directly or through the network 140. As yet another example, the terminal device 110 may be connected to the storage device 120 through the network 140 or directly (as indicated by the bi-directional arrow in dotted lines linking the terminal device 110 and the storage device 120.

The terminal device 110 may receive, transmit, input, and/or output data. In some embodiments, the data may include text data, speech data, computer instructions, etc. For example, the terminal device 110 may obtain user input data (e.g., a speech input, a key input), send the user input data to the processing device 130 for processing, and receive response data generated by the processing device 130 based on the user input data. Further, the terminal device 110 may output the response data in a form of speech to realize a human-computer interaction. As another example, the terminal device 110 may obtain text data from the storage device 120 and process the text data to generate speech data, or send the text data to the processing device 130 for processing and receive the response data generated by the processing device 130 based on the text data.

In some embodiments, the response data received by the terminal device 110 may include speech data, text data, computer instructions, or the like, or any combination thereof. When the response data is the speech data, the terminal device 110 may output the speech data through an output device such as a loudspeaker or a microphone. When the response data is the text data or the computer instructions, the terminal device 110 may process the text data or the computer instructions to generate the speech data.

In some embodiments, the terminal device 110 may include a mobile device 111, a tablet computer 112, a laptop computer 113, a robot 114, or the like, or any combination thereof. For example, the mobile device 111 may include a mobile phone, a personal digital assistant (PDA), or the like, or any combination thereof. As another example, the robot 114 may include a service robot, a teaching robot, a smart housekeeper, a speech assistant, or the like, or any combination thereof.

In some embodiments, the terminal device 110 may include an input device, an output device, etc. In some embodiments, the input device may include a mouse, a keyboard, a microphone, a video camera, or the like, or any combination thereof. In some embodiments, the input device may adopt a keyboard input, a touch screen input, a speech input, a gesture input, or any other similar input mechanism. Input information received through the input device may be transmitted through the network 140 to the processing device 130 for further processing. In some embodiments, the output device may include a display, a speaker, a printer, or the like, or any combination thereof. In some embodiments, the output device may be configured to output the response data received by the terminal device 110 from the processing device 130.

The storage device 120 may store data, instructions, and/or any other information. In some embodiments, the storage device 120 may store data obtained from the terminal device 110 and/or the processing device 130. For example, the storage device 120 may store the user input data obtained by the terminal device 110. In some embodiments, the storage device 120 may store data and/or instructions that the terminal device 110 or the processing device 130 may execute or use to perform exemplary methods described in the present disclosure.

In some embodiments, the storage device 120 may include a mass memory, a removable memory, a volatile read-and-write memory, a read-only memory (ROM), or the like, or any combination thereof. In some embodiments, the storage device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 120 may be connected to the network 140 to communicate with at least one other component (e.g., the terminal device 110, the processing device 130) of the speech synthesis system 100. The at least one component of the speech synthesis system 100 may access data, instructions or other information stored in the storage device 120 through the network 140. In some embodiments, the storage device 120 may directly connect or communicate with one or more components (e.g., the terminal device 110) of the speech synthesis system 100. In some embodiments, the storage device 120 may be integrated into the terminal device 110 and/or the processing device 130.

The processing device 130 may process data and/or information obtained from the terminal device 110 or the storage device 120. In some embodiments, the processing device 130 may obtain pre-stored computer instructions from the storage device 120, and perform the computer instructions to implement methods and/or processes involved in the present disclosure. For example, the processing device 130 may obtain the user input data from the terminal device 110 and generate the response data corresponding to the user input data. As another example, the processing device 130 may train an acoustic model based on sample information. As yet another example, the processing device 130 may generate a prediction mel spectrum based on text information and a trained acoustic model, and generate speech response data based on the prediction mel spectrum.

In some embodiments, the processing device 130 may be a single server or a server group. The server group may be centralized or distributed. In some embodiments, the processing device 130 may be local or remote. For example, the processing device 130 may access information and/or data from the terminal device 110 and/or the storage device 120 through the network 140. As another example, the processing device 130 may be directly connected to the terminal device 110 and/or the storage device 120 to access information and/or data. In some embodiments, the processing device 130 may be implemented on a cloud platform. For example, the cloud platform may include a private cloud, a public cloud, a hybrid cloud, a community cloud, a distributed cloud, an inter-cloud, a multi-cloud, or the like, or any combination thereof.

The network 140 may facilitate exchange of information and/or data. The network 140 may include any suitable network capable of facilitating the exchange of information and/or data of the speech synthesis system 100. In some embodiments, at least one component (e.g., the terminal device 110, the processing device 130, the storage device 120) of the speech synthesis system 100 may exchange information and/or data with at least one other component through the network 140. For example, the processing device 130 may obtain the user input data from the terminal device 110 through the network 140. As another example, the terminal device 110 may obtain the response data from the processing device 130 or the storage device 120 through the network 140.

In some embodiments, the network 140 may be any type of wired or wireless network, or any combination thereof. Merely by way of example, the network 140 may include a cable network, a wired network, a fiber optic network, a telecommunications network, an intranet, an Internet, a local area network (LAN), a wide area network (WAN), a wireless local area network (WLAN), a metropolitan area network (MAN), a public switched telephone network (PSTN), a Bluetooth network, a ZigBee network, a near field communication (NFC) network, or the like, or any combination thereof. In some embodiments, the network 140 may include at least one network access point. For example, the network 140 may include wired and/or wireless network access points (e.g., base stations and/or internet exchange points) through which at least one component of the speech synthesis system 100 may be connected to network 140 to exchange data and/or information.

It should be noted that the above descriptions of the speech synthesis system 100 are merely provided for the purposes of illustration, and not intended to limit the scope of the present disclosure. For persons having ordinary skills in the art, various modifications and variations may be made under the teachings of the present disclosure. However, those modifications and variations do not depart from the scope of the present disclosure.

Figure 2:
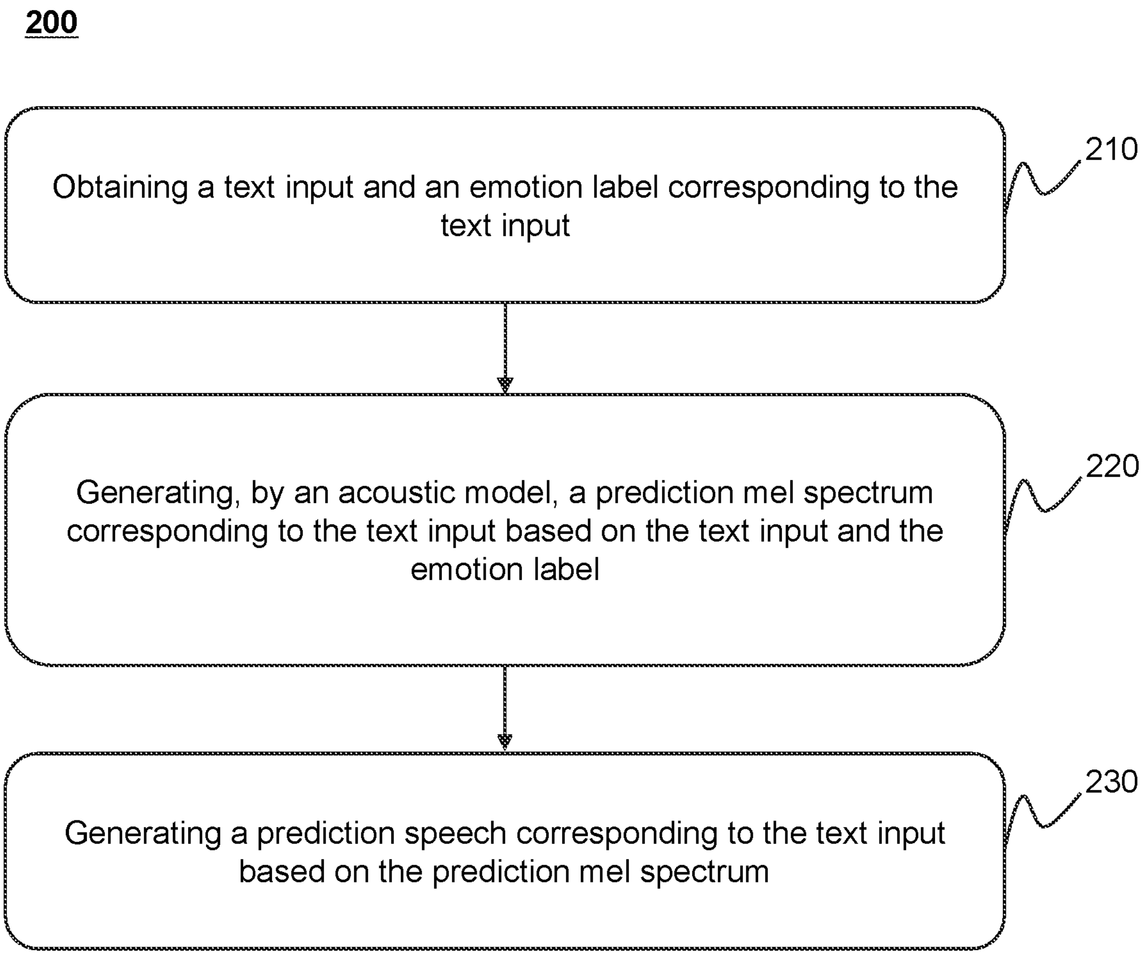
FIG. 2 is a flowchart illustrating an exemplary process for speech synthesis according to some embodiments of the present disclosure.

FIG. 2 is a flowchart illustrating an exemplary process for speech synthesis according to some embodiments of the present disclosure. In some embodiments, process 200 may be performed by processing logic. The processing logic may include hardware (e.g., a circuit, a dedicated logic, a programmable logic, a microcode, etc.), software (e.g., computer instructions), or the like, or any combination thereof. One or more operations shown in FIG. 2 may be implemented by the terminal device 110 and/or the processing device 130 shown in FIG. 1. For example, the process 200 may be stored in the storage device 120 in a form of instruction, and be invoked and/or performed by the terminal device 110 and/or the processing device 130. Operations 210-230 of the process 200 performed by the terminal device 110 and/or the processing device 130 would be described below as an example.

In 210, the terminal device 110 and/or the processing device 130 may obtain a text input and an emotion label corresponding to the text input.

In some embodiments, the text input may refer to text data that needs to be converted into a speech. In some embodiments, the text input may include words, phrases, characters, sentences, or the like, or any combination thereof.

In some embodiments, the language of the text input may include Chinese, English, Japanese, Korean, or the like, or any combination thereof.

In some embodiments, the text input may be obtained from the storage device 120. For example, the terminal device 110 and/or the processing device 130 may read, based on a speech synthesis requirement, text data from the storage device 120 as the text input.

In some embodiments, the text input may be obtained based on a user input. For example, the terminal device 110 and/or the processing device 120 may receive the user input (e.g., a text input, a speech input), and analyze and process the user input to generate the text data corresponding to the user input, and designate the text data as the text input.

In some embodiments, the emotion label may reflect a basic emotion tone or an emotion characteristic of the text input. In some embodiments, the emotion label may include neutral, happy, sad, angry, scared, disgusted, surprised, or the like, or any combination thereof.

In some embodiments, the emotion label may be pre-configured. For example, an emotion label may be configured for at least one sentence/word/character in the text data. The emotion label may be stored together with the text data in the storage device 120. When the terminal device 110 and/or the processing device 130 read the text data from the storage device 120, the emotion label corresponding to the text data may be obtained at the same time.

In some embodiments, the emotion label may be determined by processing the text input. For example, when the text input is the text data in response to the user input, the emotion label corresponding to the text input may be determined by searching a database or extracting a feature. As another example, when the text input is the text data in response to the user input, the emotion label may be manually added.

In 220, the terminal device 110 and/or the processing device 130 may generate, by an acoustic model, a prediction mel spectrum corresponding to the text input based on the text input and the emotion label.

In some embodiments, the prediction mel spectrum may refer to acoustic feature data obtained by processing the text input and the emotion label.

In some embodiments, a trained acoustic model may be configured on the terminal device 110 and/or the processing device 130. In some embodiments, during a training process of the acoustic model, multiple processings may be performed on samples (e.g., a character-level emotion embedding processing) that are used to train the acoustic model, so that the trained acoustic model may generate rich emotion expressions. Accordingly, the prediction mel spectrum generated based on the trained acoustic model has rich emotion expressions. More descriptions regarding the acoustic model may be found elsewhere in the present disclosure, for example, FIG. 3, FIG. 4, FIGS. 5*a*-5*c*, and relevant descriptions thereof.

In 230, the terminal device 110 and/or the processing device 130 may generate a prediction speech corresponding to the text input based on the prediction mel spectrum.

In some embodiments, after the prediction mel spectrum is obtained through the trained acoustic model, the prediction mel spectrum may be further processed by a vocoder to generate the prediction speech corresponding to the text input.

In some embodiments, the vocoder may generate a speech based on the acoustic feature data. In some embodiments, the vocoder may control the quality of the synthesized speech.

In some embodiments, the vocoder may include a generator and a discriminator. In some embodiments, the generator may include a HiFi-GAN generator. In some embodiments, the generator may adopt a subband coding technology to improve a synthesis speed (e.g., the synthesis speed is more than doubled). In some embodiments, the discriminator may include a fre-GAN discriminator. In some embodiments, the discriminator may perform a downward sampling using a discrete wavelet transform. Accordingly, high-frequency information may be preserved, thereby reducing a distortion of a high-frequency part in the output of the trained acoustic model.

It should be noted that the above descriptions about the process 200 are merely provided for the purposes of illustration, and are not intended to limit the scope of the present disclosure. For those skilled in the art, various modifications and changes may be made under the teachings of the present disclosure. However, these modifications and changes are still within the scope of the present disclosure. More descriptions regarding the process 200 may be found elsewhere in the present disclosure, for example, FIG. 6*a*, FIG. 6*b*, and relevant descriptions thereof.

Figure 3:
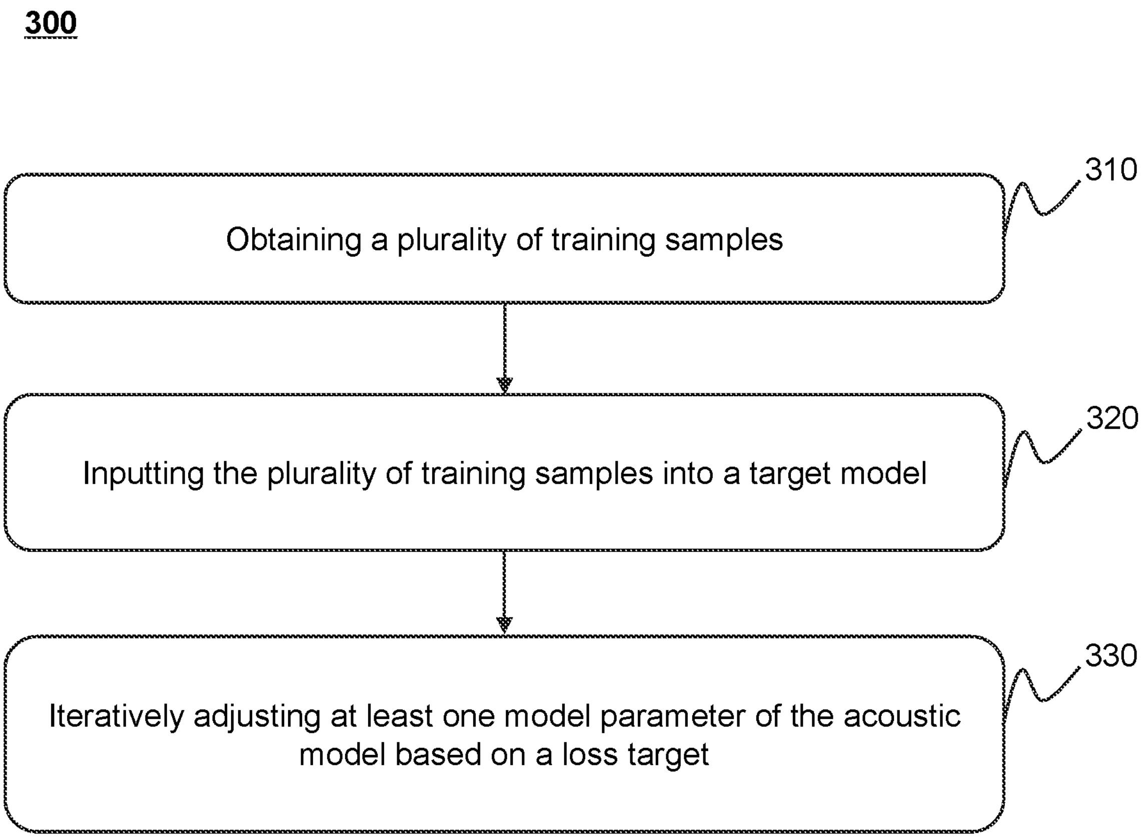
FIG. 3 is a flowchart illustrating an exemplary process for training an acoustic model according to some embodiments of the present disclosure.

FIG. 3 is a flowchart illustrating an exemplary process for training an acoustic model according to some embodiments of the present disclosure. In some embodiments, process 300 may be performed by the terminal device 110 and/or the processing device 130. In some embodiments, the process 300 may be performed by an acoustic model training device. Operations 310-330 of the process 300 performed by the processing device 130 would be described below as an example.

In 310, the processing device 130 may obtain a plurality of training samples.

In some embodiments, each of the plurality of training samples may include a sample text input, a sample emotion label corresponding to the sample text input, and a sample reference mel spectrum corresponding to the sample text input.

In some embodiments, as described in connection with operation 210, the sample text input may refer to text data in the training sample. The sample emotion label may reflect a basic emotion tone or an emotion characteristic of the sample text input. The sample reference mel spectrum may refer to a mel spectrum corresponding to a real speech (or a standard speech) corresponding to the sample text input.

In some embodiments, the training sample may include the sample text input corresponding to multiple languages, so that the trained acoustic model may be capable of processing text input in multiple languages.

In some embodiments, at least a part of the plurality of training samples may be obtained from the storage device 120 and/or an external database.

In some embodiments, the processing device 130 may obtain a sample emotion intensity and at least one speech sample corresponding to the sample text input. One speech sample may correspond to a candidate emotion intensity. The processing device 130 may obtain at least one candidate mel spectrum based on the at least one speech sample and determine a reference emotion intensity corresponding to each of the at least one candidate mel spectrum. Further, the processing device 130 may determine a candidate mel spectrum based on the sample emotion intensity and at least one reference emotion intensity and designate the candidate mel spectrum as the sample reference mel spectrum.

In some embodiments, the emotion intensity may be a parameter representing an emotion style and an emotion expression intensity of a text or speech. In some embodiments, the sample emotion intensity may refer to a parameter used to evaluate the emotion style and the emotion expression intensity corresponding to the sample text input. The stronger the emotion corresponding to the sample text input, the greater the corresponding emotion intensity.

In some embodiments, the emotion intensity may be quantified as a scale of 0-10, and a greater scale indicates a stronger corresponding emotion intensity. In some embodiments, the sample emotion intensity of the sample text input may be represented based on an emotion vector sequence. A statement division may be performed on the sample text input to obtain multiple sub-text inputs. For example, one sentence corresponds to a sub-text. Each sub-text corresponds to a sub-emotion intensity. The sub-emotion intensity may be expressed as a vector. Vectors of the sub-emotion intensities corresponding to all sub-texts may be arranged in a sequence, so that the sample emotion intensity of the sample text input may be obtained.

Merely by way of example, an emotion vector sequence corresponding to the sample emotion intensity of a sample text input containing two sentences may be expressed as [(a, 2); (b, 4)], wherein (a, 2) indicates that a sample emotion style corresponding to the first sentence of the sample text input is neutral, and the emotion intensity of the first sentence of the sample text input is level 2, and (b, 4) indicates that a sample emotion style corresponding to the second sentence of the sample text input is happy, and the emotion intensity of the second sentence of the sample text input is level 4.

In some embodiments, the processing device 130 may obtain the sample emotion intensity in various ways. For example, the processing device 130 may obtain the sample emotion intensity corresponding to the sample text input through manual labeling. As another example, the processing device 130 may set a comparison table based on historical text sequence vectors of historical sample text inputs and the corresponding historical sample emotion intensities in historical data, and obtain the sample emotion intensity of the sample text input based on the comparison table. For example, the processing device 130 may obtain a text sequence vector of the sample text input and calculate a vector distance between the text sequence vector and each of the historical text sequence vectors in the comparison table. Further, the processing device 130 may use a historical text sequence vector with a smallest vector distance as the reference text sequence vector and take a historical sample emotion intensity corresponding to the reference text sequence vector as the sample emotion intensity corresponding to the sample text input. An exemplary vector distance may include a cosine distance, a Euclidean distance, a Hamming distance, etc.

In some embodiments, the acoustic model includes an emotion intensity extraction module, and the processing device 130 may obtain the sample emotion intensity through the emotion intensity extraction module. The emotion intensity extraction module may be configured to determine the sample emotion intensity corresponding to the sample text input based on the text sequence vector of the sample text input and the sample emotion label corresponding to the sample text input. More descriptions regarding the obtaining of the sample emotion intensity through the emotion intensity extraction module may be found elsewhere in the present disclosure, for example, FIG. 7 and relevant descriptions thereof.

The speech sample may refer to speech data corresponding to the sample text input. In some embodiments, the speech sample may include the speech data recorded with various timbres and emotion intensities for the sample text input.

The candidate emotion intensity may refer to an emotion intensity to be selected. In some embodiments, one speech sample corresponds to a candidate emotion intensity. For example, a speech sample 1 may correspond to a candidate emotion intensity (b, 4) which indicates that the emotion style of the speech sample 1 is happy, and the emotion intensity of the speech sample 1 is level 4.

In some embodiments, at least a part of the speech sample may be retrieved from the storage device 120 and/or an external database. In some embodiments, for a sample text, the processing device 130 may obtain multiple speech samples of the sample text with different emotion intensities based on readings by different people or readings by a same person using different emotion intensities.

The candidate mel spectrum may refer to a mel spectrum corresponding to the speech sample. For example, the candidate mel spectrum of the speech sample 1 may be a mel spectrum corresponding to the speech sample 1.

In some embodiments, the processing device 130 may directly obtain at least one candidate mel spectrum through a mel filter bank based on at least one speech sample.

The reference emotion intensity may refer to an actual emotion intensity corresponding to the candidate mel spectrum.

In some embodiments, the processing device 130 may obtain the reference emotion intensity in various ways. For example, the processing device 130 may obtain the reference emotion intensity corresponding to the candidate mel spectrum through manual labeling. As another example, the processing device 130 may obtain a historical reference emotion intensity of a historical candidate mel spectrum same as the candidate mel spectrum from the historical data as the reference emotion intensity of the candidate mel spectrum.

In some embodiments, the acoustic model includes a style identification module through which the processing device 130 may obtain the reference emotion intensity. The style identification module may be configured to determine the reference emotion intensity corresponding to the candidate mel spectrum based on the candidate mel spectrum. More descriptions regarding the obtaining of the reference emotion intensity through the style identification module may be found elsewhere in the present disclosure, for example, FIG. 8 and relevant descriptions thereof.

In some embodiments, the processing device 130 may take a candidate mel spectrum corresponding to a reference emotion intensity that is the same as or closest to the sample emotion intensity as the sample reference mel spectrum. In some embodiments, when there are multiple reference emotion intensities that are the same as or closest to the sample emotion intensity, the processing device 130 may randomly select one of candidate mel spectrums corresponding to the multiple reference emotion intensities as the sample reference mel spectrum.

In the embodiments of the present disclosure, the sample emotion intensity and the at least one speech sample corresponding to the sample text input, and the at least one candidate mel spectrum corresponding to the at least one speech sample is obtained, the reference emotion intensity corresponding to each candidate mel spectrum is determined, and the sample reference mel spectrum is determined based on the sample emotion intensity and the reference emotion intensity. Therefore, when training the acoustic model, an optimal emotion intensity of the sample text input may be considered, and a mel spectrum closest to the optimal emotion intensity may be selected, which makes the emotion intensity of generated speech more reasonable and more in line with an actual need.

In 320, the processing device 130 may input the plurality of training samples into a target model.

In some embodiments, the target model may include the acoustic model and an auxiliary module. The acoustic model may include an encoder and an emotion embedding vector determination module. The encoder may be configured to determine a text sequence vector of the sample text input. The emotion embedding vector determination module may be configured to determine a sample emotion embedding vector corresponding to the sample emotion label. The auxiliary module may include an unsupervised module configured to determine a sample reference style vector corresponding to the sample reference mel spectrum. More descriptions regarding the target model may be found elsewhere in the present disclosure, for example, FIG. 4 and relevant descriptions thereof.

In some embodiments, the plurality of training samples may be input into the target model for model training. In some embodiments, the target model may include an acoustic model based on Tacotron2 or DeepVoice3.

In 330, the processing device 130 may iteratively adjust at least one model parameter of the acoustic model based on a loss target.

In some embodiments, the loss target (also referred to as a "loss function") may include at least one of a difference loss between a sample prediction style vector and the sample reference style vector, a classification loss of a vector emotion category (e.g., a difference loss between the vector emotion category and the sample emotion label), a difference loss between a sample prediction mel spectrum and the sample reference mel spectrum, or a difference loss between a prediction deep emotion feature and a reference deep emotion feature.

Merely by way of example, the loss target may include:

$$L\_emb=MSE(V\_style,V\_style\_pd) \quad (1),$$

$$L\_cls=cross\_entropy(score\_h,e) \quad (2),$$

$$L\_mel=MSE(m,m\_pd) \quad (3),\text{ and}$$

$$L\_style=StyleLoss(fmap\_gt,fmap\_pd) \quad (4),$$

where, L_emb refers to the difference loss between the sample prediction style vector and the sample reference style vector, which may be equal to an average square difference between the sample prediction style vector V_style_pd and the sample reference style vector V_style, L_cls refers to the classification loss of the vector emotion category, which may be equal to a cross entropy between the vector emotion category score_h and the sample emotion label e, L_mel refers to the difference loss between the sample prediction mel spectrum and the sample reference mel spectrum, which may be equal to an average square difference between the sample prediction mel spectrum m_pd and the sample reference mel spectrum m, L_style refers to the difference loss between the prediction deep emotion feature and the reference deep emotion feature, which may be equal to StyleLoss(fmap_gt, fmap_pd), wherein fmap_gt refers to the reference deep emotion feature, fmap_pd refers to the prediction deep emotion feature, and StyleLoss may be a Gram matrix MSE of two tensors.

In some embodiments, the loss target L=L_emb+L_cls+L_mel+L_style. In some embodiments, the loss target may be in other forms, for example, L=L_emb+L_cls+L_mel or L=L_cls+L_mel+L_style, which is not limited in the present disclosure.

In some embodiments, the training of the acoustic model may end when the loss target reaches a preset threshold. In some embodiments, the training of the acoustic model may end when a count of iterations reaches a specified requirement. In some embodiments, other training end conditions may be set, which are not limited in the present disclosure.

In the embodiments of the present disclosure, the acoustic model is trained based on a multi-dimensional loss target, so that the acoustic model may process the input text more accurately and output richer emotion information.

In some embodiments, the processing device 130 may obtain a trained target model by joint training, and accordingly obtain the trained acoustic model.

In the embodiments of the present disclosure, the trained target model is obtained by the joint training, which solves the problem of being difficult to obtain the labels when training the acoustic model independently, reduces the count of training samples needed, and improves the training efficiency.

Figure 4:
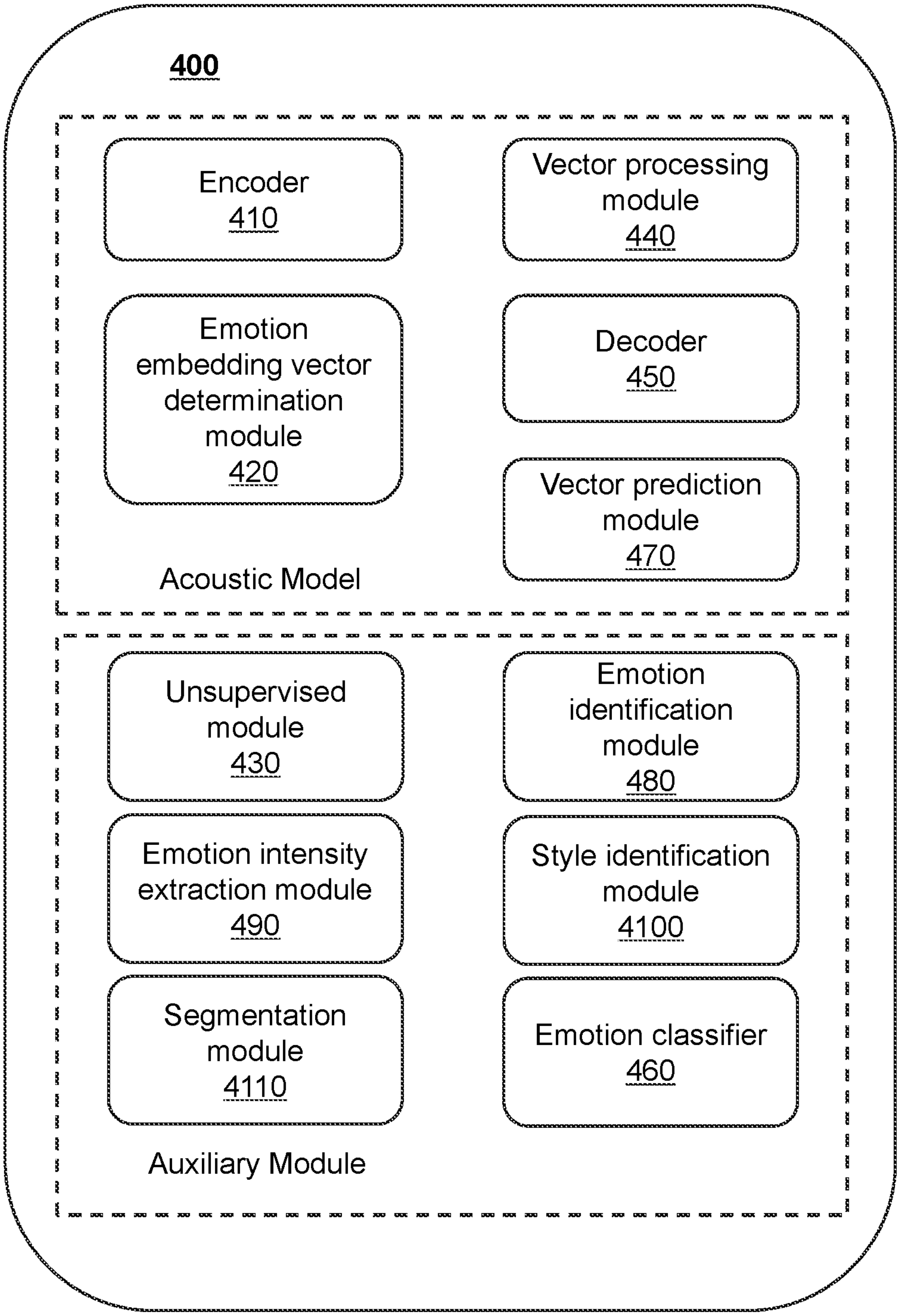
FIG. 4 is a schematic diagram illustrating an exemplary target model according to some embodiments of the present disclosure.

FIG. 4 is a schematic diagram illustrating an exemplary target model according to some embodiments of the present disclosure. In some embodiments, the target model may include an auxiliary module and an acoustic model.

As shown in FIG. 4, in some embodiments, the auxiliary module may include an unsupervised module 430, an emotion classifier 460, an emotion identification module 480, an emotion intensity extraction module 490, a style identification module 4100, and a segmentation module 4110.

The emotion intensity extraction module 490 may determine a sample emotion intensity corresponding to a sample text input. Specifically, after a afore-mentioned training sample is input into the target model, a sample text input contained in the training sample may be converted into a text sequence vector through an encoder 410 described later. The emotion intensity extraction module 490 may process the text sequence vector and the sample emotion label contained in the training sample to obtain the sample emotion intensity corresponding to the sample text input. More descriptions regarding the sample emotion intensity may be found elsewhere in the present disclosure, for example, FIG. 3 and relevant descriptions thereof.

The style identification module 4100 may determine a reference emotion intensity corresponding to a candidate mel spectrum. Specifically, after the afore-mentioned training sample is input into the target model, the processing device 130 may obtain a speech sample corresponding to the sample text input in the training sample, and further obtain the candidate mel spectrum of the speech sample. The style identification module 4100 may process the obtained candidate mel spectrum to obtain the reference emotion intensity of the candidate mel spectrum. More descriptions regarding the reference emotion intensity may be found elsewhere in the present disclosure, for example, FIG. 3 and relevant descriptions thereof.

The unsupervised module 430 may determine a sample reference style vector corresponding to the sample reference mel spectrum. Specifically, after the afore-mentioned training sample is input into the acoustic model, the sample emotion intensity and the reference emotion intensity may be obtained through the emotion intensity extraction module 490 and the style identification module 4100, and then the sample reference mel spectrum may be determined. More descriptions regarding determining the sample reference mel spectrum based on the sample emotion intensity and the reference emotion intensity may be found elsewhere in the present disclosure, for example, FIG. 3 and relevant descriptions thereof. The unsupervised module 430 may process the obtained sample reference mel spectrum to obtain the sample reference style vector corresponding to the sample reference mel spectrum.

In some embodiments, the sample reference style vector may refer to a vector representing a style (e.g., serious, humorous, overcast, etc.) of the sample text input. In the present disclosure, the "unsupervised" may refer to a generalized unsupervised training mode without a preset label.

In some embodiments, after the segmentation module segments the determined sample reference mel spectrum into sub-segment sample reference mel spectrums, the unsupervised module may process the sub-segment sample reference mel spectrums to determine sub-segment sample reference style vectors corresponding to the sub-segment sample reference mel spectrums. Each sub-segment sample reference style vector may include a sub-segment sample reference style feature and a sample reference style relationship feature of previous and subsequent sub-segments.

In some embodiments, the sub-segment sample reference style feature may refer to a vector representing a style (e.g., serious, humorous, overcast, etc.) of a sub-segment sample text input corresponding to sub-segment sample reference mel spectrum. The sub-segment sample reference style feature has the same form as the sample reference style vector. Hoverer, the sub-segment sample reference style feature has a smaller data volume, and only corresponds to the sub-segment sample text input.

In some embodiments, the sample reference style relationship feature may refer to a feature representing a relationship between a sub-segment sample text input and a sample reference style vector between the previous and subsequent sub-segments, which may be expressed in a vector form. For example, a vector representing the sample reference style relationship feature between a sub-segment sample text input 1 and the previous and subsequent sub-segments is expressed as (1,0), which indicates that a relationship between the sub-segment sample text input 1 and a sample reference style vector of a previous sub-segment sample text input is gradual and a code of the relationship is set to 1, and that a relationship between the sub-segment sample text input 1 and a sample reference style vector of a subsequent sub-segment sample text input is turning and a code of the relationship is set to 0.

In some embodiments, a plurality of sub-segment sample reference style vectors are arranged in order to obtain the sample reference style vector of the sample text input.

In the embodiments of the present disclosure, the sub-segment sample reference style vectors corresponding to the sub-segment sample reference mel spectrums are determined by the unsupervised module, which better reflects style changes of different sub-segments in the text, thereby obtaining an accurate and true sample reference style vector.

In some embodiments, the auxiliary module may include the segmentation module 4110. The segmentation module 4110 is configured to segment the sample text input into one or more sub-segment sample text inputs, segment the sample emotion label into one or more sub-segment sample emotion labels, and segment the sample reference mel spectrum into one or more sub-segment sample reference mel spectrums based on a preset segmentation rule. One sub-segment sample text input corresponds to one sub-segment sample emotion label and one sub-segment sample reference mel spectrum.

The preset segmentation rule may refer to a preset rule for segmenting a training sample. For example, the preset segmentation rule may be to segment the sample text input into a fixed number of sub-segment text inputs. As another example, the preset segmentation rule may be to segment the sample text input based on a preset punctuation mark (e.g., a comma, a period, a semicolon, etc.). In some embodiments, the preset segmentation rule may be preset based on experience.

A sub-segment sample text input may refer to a continuous sample text in a small segment that is obtained by segmenting the sample text input. For example, the sample text input is "It's sunny today, I'm very happy!", and the sub-segment sample text inputs may include "It's sunny today" and "I'm very happy."

A sub-segment sample emotion label may refer to an emotion label, corresponding to a sub-segment sample text input, obtained by segmenting the sample emotion label. For example, a sub-segment sample emotion label corresponding to the sub-segment sample text input "it's sunny today" may be neutral, and a sub-segment sample emotion label corresponding to the sub-segment sample text input "I'm very happy" may be happy.

A sub-segment sample reference mel spectrum may refer to a sample reference mel spectrum, corresponding to a sub-segment sample text input and a sub-segment sample emotion label, obtained by segmenting the sample reference mel spectrum. For example, a sub-segment sample reference mel spectrum may be a mel spectrum corresponding to the sub-segment sample text input "It's sunny today."

In some embodiments, the processing device 130 may directly segment a training sample by the segmentation module 4110 based on the preset segmentation rule to obtain the one or more sub-segment sample text inputs, the one or more sub-segment sample emotion labels, and the one or more sub-segment sample reference mel spectrums. For example, the sample text input is "It is sunny today, I am very happy." The preset segmentation rule is to segment the sample text input into sub-segment sample text inputs based on the punctuation mark, and the segmentation module 4110 may segment the sample text input into a sub-segment sample text input 1 "It is sunny today" and a sub-segment sample text input 2 "I am very happy;" segment the sample emotion label into sub-segment sample emotion labels 1 and 2 respectively corresponding to the sub-segment sample text inputs 1 and 2; and segment the sample reference mel spectrum into sub-segment sample reference mel spectrums 1 and 2 respectively corresponding to the sub-segment sample text inputs 1 and 2.

In the embodiments of the present disclosure, the segmentation module segments, based on the preset segmentation rule, the sample text into the one or more sub-segment sample text inputs, segments the sample emotion label into the one or more sub-segment sample emotion labels, and segments the sample reference mel spectrum into the one or more sub-segment sample reference mel spectrums. The target model may be trained based on a sub-segment sample (i.e., the one or more sub-segment sample text inputs, the one or more sub-segment sample emotion labels, and the one or more sub-segment sample reference mel spectrums), so that a synthesized speech obtained by subsequent processing is more suitable for a real language emotion expression.

The emotion classifier 460 may determine a vector emotion category based on a hidden state vector described later. In some embodiments, internal parameters of an emotion embedding vector determination module 420, a vector processing module 440 and/or the emotion classifier 460 may be adjusted and/or updated based on a difference and/or a correlation between the vector emotion category and the sample emotion label. The emotion classifier 460 may constrain a character-level comprehensive emotion vector described later, thereby enhancing the emotion accuracy of the synthesized speech.

In some embodiments, the emotion classifier 460 may be further configured to determine a sub-segment vector emotion category based on a sub-segment hidden state vector described later. In some embodiments, the vector emotion category may be determined based on one or more sub-segment vector emotion categories. For example, the emotion classifier 460 may arrange one or more sub-segment vector emotion categories in order to obtain the vector emotion category.

The emotion identification module 480 may be configured to determine a prediction deep emotion feature corresponding to the sample prediction mel spectrum and a reference deep emotion feature corresponding to the sample reference mel spectrum. In some embodiments, internal parameters of a decoder 450 may be adjusted and/or updated based on a difference and/or a correlation between the prediction deep emotion feature and the reference deep emotion feature.

In some embodiments, the segmentation module 4110 may be further configured to segment the sample prediction mel spectrum described later into one or more sub-segment prediction mel spectrums based on the preset segmentation rule. The emotion identification module 480 may be further configured to determine a sub-segment prediction deep emotion feature corresponding to each sub-segment prediction mel spectrum and a sub-segment reference deep emotion feature corresponding to each sub-segment sample reference mel spectrum.

A sub-segment prediction deep emotion feature may include a deep emotion feature corresponding to a sub-segment prediction mel spectrum and a deep emotion relationship feature of previous and the subsequent sub-segments.

In some embodiments, the deep emotion feature corresponding to the sub-segment prediction mel spectrum may have a same form as the prediction deep emotion feature. However, the deep emotion feature corresponding to the sub-segment prediction mel spectrum may have a smaller data volume, and only correspond to the sub-segment prediction mel spectrum.

In some embodiments, the deep emotion relationship feature of the previous and the subsequent sub-segments may refer to a feature representing a relationship between a sub-segment sample text input and a deep emotion between the previous and the subsequent sub-segments, which may be expressed in a vector form. For example, a vector representing the deep emotion relationship feature between a segment prediction mel spectrum 1 and the previous and subsequent sub-segments is expressed as (1,0), which means that a relationship between the sub-segment prediction mel spectrum 1 and deep emotion of a previous sub-segment prediction mel spectrum is gradual and a code of the relationship is set to 1, and that a relationship between the sub-segment prediction mel spectrum 1 and the deep emotion of a subsequent sub-segment prediction mel spectrum is turning and a code of the relationship is set to 0.

In some embodiments, the prediction deep emotion feature may be determined based on one or more sub-segment prediction deep emotion features. For example, the emotion identification module 480 may sequentially arrange a plurality of sub-segment prediction deep emotion features corresponding to the prediction mel spectrum to obtain the prediction deep emotion feature of the prediction mel spectrum.

The sub-segment reference deep emotion feature is similar to the sub-segment prediction deep emotion feature, which may include a deep emotion feature corresponding to the sub-segment sample reference mel spectrum and a deep emotion relationship feature of previous and subsequent sub-segments. More details may refer to the above description regarding the sub-segment prediction deep emotion feature, which is not repeated herein.

In some embodiments, the reference deep emotion feature may be determined based on one or more sub-segment reference deep emotion features. For example, the emotion identification module 480 may sequentially arrange a plurality of sub-segment reference deep emotion features corresponding to the sample reference mel spectrum to obtain the reference deep emotion feature of the sample reference mel spectrum.

As shown in FIG. 4, in some embodiments, the acoustic model may include the encoder 410, the emotion embedding vector determination module 420, the vector processing module 440, the decoder 450, and a vector prediction module 470.

The encoder 410 may be configured to determine the text sequence vector of the sample text input. Specifically, after a afore-mentioned training sample is input into the acoustic model, the sample text input contained in the training sample may be converted into the text sequence vector through the encoder 410. In some embodiments, the text sequence vector may refer to a vector representing the sample text input.

In some embodiments, the encoder 410 may be further configured to determine sub-segment text sequence vectors of the sub-segment sample text inputs. Specifically, after the segmentation module 4110 segments the sample text input into one or more sub-segment sample text inputs, the encoder 410 may convert each sub-segment sample text input into a sub-segment text sequence vector. In some embodiments, the sub-segment text sequence vector may refer to a vector representing the corresponding sub-segment sample text input.

The emotion embedding vector determining module 420 may determine a sample emotion embedding vector corresponding to the sample emotion label. Specifically, after the afore-mentioned training sample is input into the acoustic model, the sample emotion label included in the training sample may be processed by the emotion embedding vector determination module 420 to obtain the corresponding sample emotion embedding vector. In some embodiments, the sample emotion embedding vector may refer to a vector representing the emotion of the sample text input. In the present disclosure, the "supervised" may refer to a generalized supervised training mode with a preset label.

In some embodiments, the emotion embedding vector determining module 420 may further determine a sub-segment sample emotion embedding vector corresponding to a sub-segment sample emotion label. Specifically, after the segmentation module 4110 segments the sample emotion label into the one or more sub-segment sample emotion labels, each sub-segment sample emotion label may be processed by the emotion embedding vector determination module 420 to obtain the corresponding sub-segment sample emotion embedding vector.

In some embodiments, the sub-segment sample emotion embedding vector may refer to a vector representing the emotion of the sub-segment sample text input. In some embodiments, the sub-segment sample emotion embedding vector may include a sub-segment emotion feature and an emotion relationship feature of previous and subsequent sub-segments. The emotion of each sub-segment may be a mixture of a plurality of emotions, and the sub-segment emotion feature of the sub-segment may include the plurality of emotions of the sub-segment and their proportions.

For example, a sub-segment emotion feature 1 may be (1, 55%; 2, 35%; 3, 10%) in which 1, 2, and 3 respectively are encodings of three emotions of happiness, excitement, and surprise, and 55%, 35%, and 10% respectively are proportions of the three emotions in the sub-segment emotion feature 1. The emotion relationship feature may refer to a relationship between the sub-segment sample text input and the sub-segment emotion feature of the previous and subsequent sub-segments, which may be expressed in a vector form, for example, (1,0), which indicates that a relationship between a sub-segment sample text input 1 and the emotion feature of a previous sub-segment sample text input is gradual and a code of the relationship is set to 1, and that a relationship between the sub-segment sample text input 1 and the emotion feature of a subsequent sub-segment sample text input is turning and the code of the relationship is set to 0.

In some embodiments, a plurality of sub-segment sample reference style vectors are arranged in order to obtain the sample reference style vector of the sample text input.

In the embodiments of the present disclosure, after the sample emotion embedding vector corresponding to the sample text input is generated by the emotion embedding vector determination module 420, the sample reference style vector corresponding to the sample text input is extracted from the sample reference mel spectrum by the unsupervised module 430. Therefore, different emotion expression manners or intensities of different text inputs may be considered comprehensively, so that the emotion expression is richer. Through the combination of the emotion embedding vector determination module 420 and the unsupervised module 430, the emotion and style corresponding to the sample text input may be considered comprehensively, so that the synthesized speech obtained by subsequent processing may be more realistic, natural, and full of emotion.

The vector processing module 440 may determine a comprehensive emotion vector based on a sum of the sample emotion embedding vector and the sample reference style vector. In some embodiments, the comprehensive emotion vector may be a character-level embedding vector, so that emotion expression of sentences, words, and even characters may be more accurately controlled. Compared with a sentence-level embedding vector, the character-level embedding vector may solve the problem of coarser style embedding granularity of the sentence-level embedding vector, and better reflect style changes of different words or characters in a sentence.

In some embodiments, the vector processing module 440 may further determine a sub-segment comprehensive emotion vector based on a sum of the sub-segment sample emotion embedding vector and the sub-segment sample reference style vector. In some embodiments, the vector processing module 440 may determine a comprehensive emotion vector based on one or more sub-segment comprehensive emotion vectors. For example, the vector processing module 440 may arrange the one or more sub-segment comprehensive emotion vectors in order to determine the comprehensive emotion vector.

The decoder 450 may determine the sample prediction mel spectrum based on a cascade vector of the text sequence vector and the comprehensive emotion vector. Specifically, the cascade vector may be obtained by adding the text sequence vector and the comprehensive emotion vector. In some embodiments, the cascade vector may be obtained in other ways (e.g., by multiplying the text sequence vector and the comprehensive emotion vector), which is not limited in the present disclosure.

In some embodiments, the vector processing module 440 may further be configured to determine the hidden state vector. The hidden state vector may refer to a low-dimensional dense embedding vector related to the comprehensive emotion vector.

In some embodiments, the vector processing module 440 may further determine a sub-segment hidden state vector corresponding to the sub-segment comprehensive emotion vector. The sub-segment hidden state vector may refer to a low-dimensional embedding vector related to the sub-segment comprehensive emotion vector.

The vector prediction module 470 may determine the sample prediction style vector based on the text sequence vector. In some embodiments, the sample prediction style vector may refer to a vector representing a style prediction result corresponding to the sample text input. In some embodiments, internal parameters of the unsupervised module 430 and/or the vector prediction module 470 may be adjusted and/or updated based on a difference and/or a correlation between the sample prediction style vector and the sample reference style vector.

In some embodiments, the vector prediction module 470 may further determine the sub-segment sample prediction style vector based on the sub-segment text sequence vector.

The sub-segment sample prediction style vector may refer to a vector representing a style prediction result corresponding to the sub-segment sample text input. For example, a sub-segment sample prediction style vector (A, 70%; B, 30%) may indicate that the style prediction result of the sub-segment sample text input 1 "It's sunny today" is that the probability of the style of the sub-segment sample text input 1 is 70% dull and 30% cheerful.

In some embodiments, the sample prediction style vector may be determined based on one or more sub-segment sample prediction style vectors. For example, the vector prediction module 470 may arrange the one or more sub-segment sample prediction style vectors in order to determine the sample prediction style vector.

It should be noted that the above descriptions about the acoustic model 400 are merely provided for the purposes of illustration, and not intended to limit the scope of the present disclosure. It may be understood that, for those skilled in the art, according to the description of the present disclosure, without departing from the principles of the embodiments of the present disclosure, various modules may be combined arbitrarily, or form a subsystem, or connect with other modules. For example, the encoder 410, the emotion embedding vector determination module 420, the unsupervised module 430, the vector processing module 440, the decoder 450, the emotion classifier 460, the vector prediction module 470, the emotion identification module 480, the emotion intensity extraction module 490, the style identification module 4100, and the segmentation module 4110 in FIG. 4 may be different modules in one model, or may be one module that implements the functions of the above two or more modules. For example, the emotion embedding vector determination module 420 and the unsupervised module 430 may be two separate modules, or one module with both a supervised learning function and an unsupervised learning function. As another example, modules or devices such as the reference style vector encoder, the vector prediction module 470, and the emotion identification module 480 may be replaced by other structures. As yet another example, multiple modules may share a storage module, or each module may have its own storage module. Those variations and modifications may be within the scope of the embodiments of the present disclosure.

More descriptions regarding the above modules may be found elsewhere in the present disclosure, for example, FIG. 5 and relevant descriptions thereof.

Figure 5A:
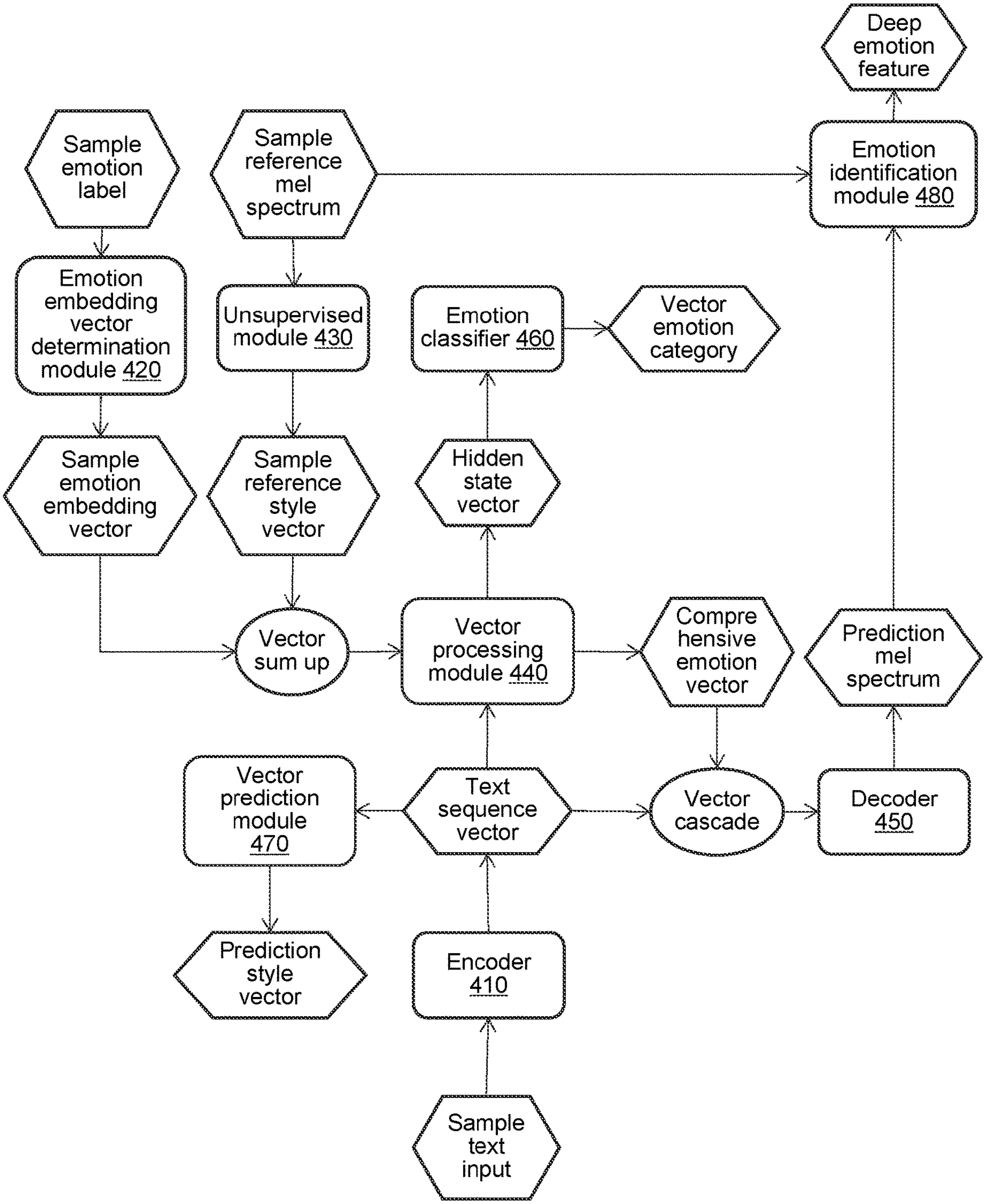
FIG. 5*a*, FIG. 5*b*, and FIG. 5*c* are schematic diagrams each of which illustrates an exemplary training process of an acoustic model according to some embodiments of the present disclosure.

FIG. 5*a* is a schematic diagram illustrating an exemplary training process of an acoustic model according to some embodiments of the present disclosure.

In some embodiments, the training of the acoustic model may be implemented based on the training of a target model (including the acoustic model and an auxiliary module). As shown in FIG. 5*a*, during training, an input of the target module may include a sample text input, a sample emotion label, and a sample reference mel spectrum.

After the training sample is input into the target model, an encoder 410 may process the sample text input in the training sample to obtain a text sequence vector corresponding to the sample text input. An emotion embedding vector determination module 420 may process the sample emotion label in the training sample to obtain a sample emotion embedding vector corresponding to the sample text input. An unsupervised module 430 may process the sample reference mel spectrum in the training sample to obtain a sample reference style vector corresponding to the sample text input.

In some embodiments, the encoder 410 may convert the sample text input into one hot encoding which may adopt one or more text encoding modes among word2vec, doc2vec, TFIDF, and FastText. In some embodiments, the emotion embedding vector determining module 420 may include an emotion embedding dictionary, an emotion embedding database, etc. In some embodiments, the unsupervised module 430 may include a reference style vector encoder. In some embodiments, the reference style vector encoder may include a combination of a convolutional neural network (CNN) and a recurrent neural network (RNN). For example, a combination of a 5-layer CNN and a 1-layer RNN. In some embodiments, the reference style vector encoder may be implemented in other forms, for example, include a CNN with more or less layer than the 5-layer CNN and/or an RNN with more or less layer than the 1-layer RNN, which is not limited in the present disclosure.

A vector processing module 440 may determine a comprehensive emotion vector corresponding to the sample text input based on a sum of the sample emotion embedding vector obtained by the emotion embedding vector determination module 420 and the sample reference style vector obtained by the unsupervised module 430. As described elsewhere in the present disclosure, the comprehensive emotion vector is a character-level embedding vector. Further, the vector processing module 440 may generate a hidden state vector related to the comprehensive emotion vector. In some embodiments, the vector processing module 440 may include an RNN.

A decoder 450 may generate a prediction mel spectrum based on a cascade vector of the text sequence vector obtained by the encoder 410 and the comprehensive emotion vector obtained by the vector processing module 440. Further, the emotion identification module 480 may respectively process the sample reference mel spectrum and the prediction mel spectrum obtained by the decoder 450 to obtain a prediction deep emotion feature corresponding to the prediction mel spectrum and a reference deep emotion feature corresponding to the sample reference mel spectrum. In some embodiments, internal parameters of the decoder 450 may be adjusted and/or updated based on a difference and/or a correlation between the prediction deep emotion feature and the reference deep emotion feature, so as to improve the ability of the target model to determine the prediction mel spectrum.

In some embodiments, the decoder 450 may include a dynamic decoding network and/or a static decoding network. In some embodiments, the emotion identification module 480 may be obtained through pre-training. In some embodiments, the emotion identification module 480 may include at least one of a bidirectional gated recurrent unit (GRU), a pooling layer, or a linear layer. In some embodiments, a feature of a preset dimension (e.g., 80 dimensions) after the pooling layer may be used as the deep feature.

An emotion classifier 460 may determine a vector emotion category based on the hidden state vector output by the vector processing module 440. In some embodiments, internal parameters of the emotion embedding vector determination module 420, the vector processing module 440, and/or the emotion classifier 460 may be adjusted and/or updated based on a difference and/or a correlation between the emotion category and the sample emotion label, so as to improve the ability to determine the emotion expression of the target model.

A vector prediction module 470 may process the text sequence vector obtained by the encoder 410 to obtain a prediction style vector. In some embodiments, internal parameters of the unsupervised module 430 and/or the vector prediction module 470 may be adjusted and/or updated based on a difference and/or a correlation between the sample prediction style vector and the sample reference style vector to improve the ability to determine the style of the target model.

A specific form of a loss target of the target model may refer to in FIG. 3 and the related descriptions, which is not repeated herein.

In some embodiments, the emotion classifier 460 may include a linear classifier. In some embodiments, the vector prediction module 470 may include a combination of an RNN and a linear neural network (Linear). For example, a combination of a 1-layer RNN and a two-layer Linear.

It should be noted that the above descriptions about the training process of the target model are merely provided for the purposes of illustration. In some embodiments, the training process of the target model may include more or fewer operations than the above descriptions, or different operations from the above descriptions.

Figure 5B:
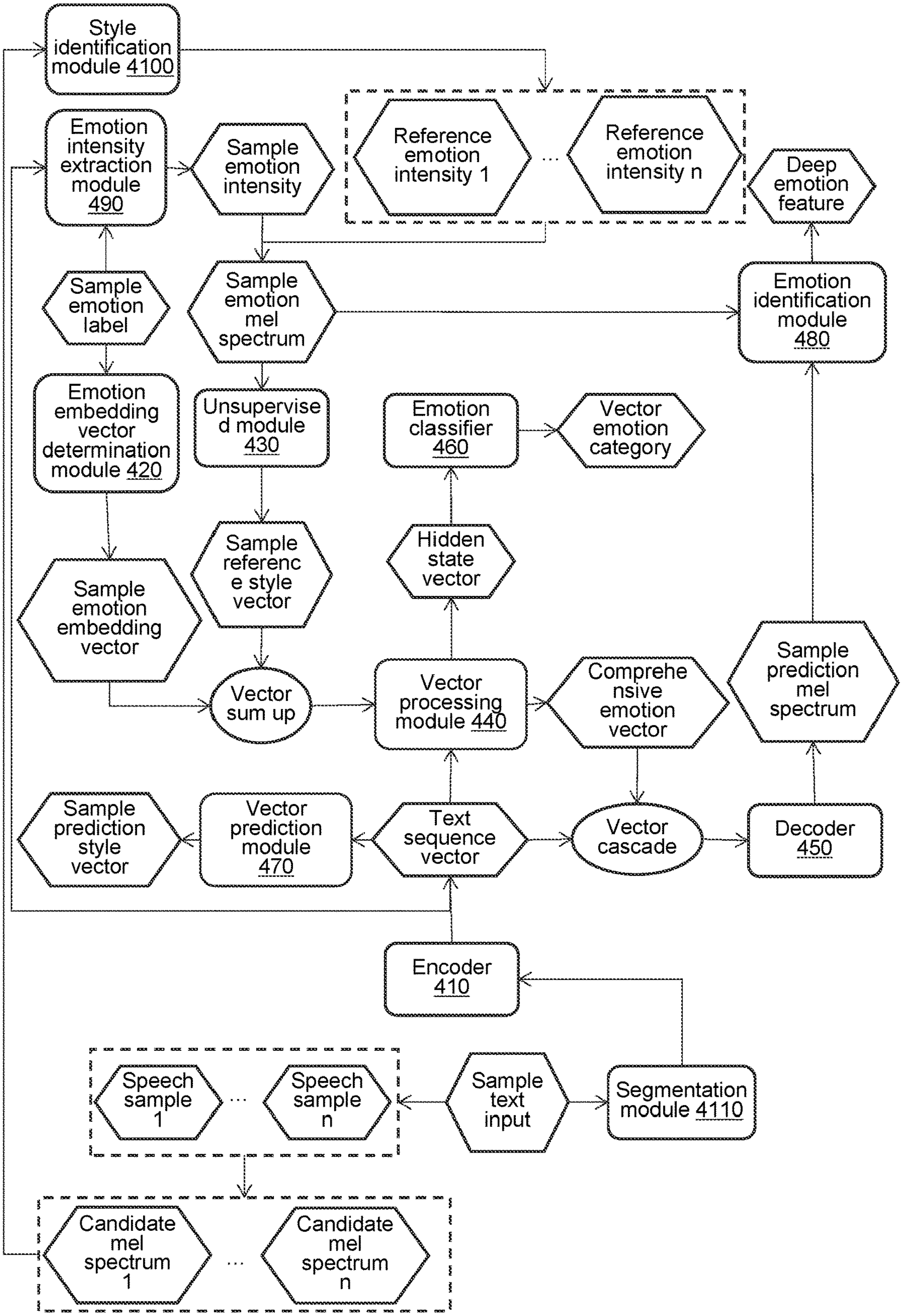

FIG. **5*b* is a schematic diagram illustrating an exemplary training process of an acoustic model according to some embodiments of the present disclosure. As shown in FIG. 5*b*, an auxiliary module of the target model may include an emotion intensity extraction module 490, a style identification module 4100, and a segmentation module 4110**. During training, an input of the target model may include a sample text input and a sample emotion label.

After the training sample is input into the target model, the target model may obtain at least one speech sample of the sample text input, and then obtain at least one candidate mel spectrum. The style identification module 4100 may determine at least one reference emotion intensity corresponding to at least one candidate mel spectrum based on the at least one candidate mel spectrum.

The encoder 410 may process the sample text input in the training sample to obtain the text sequence vector corresponding to the sample text input.

The emotion intensity extraction module 490 may determine the sample emotion intensity corresponding to the sample text input based on the text sequence vector of the sample text input and the sample emotion label corresponding to the sample text input.

The target model may determine a candidate mel spectrum based on the sample emotion intensity and the reference emotion intensity as the sample reference mel spectrum.

The subsequent training process of the target model please refer to FIG. **5*a* and its related descriptions. More descriptions regarding the emotion intensity extraction module 490 please refer to FIG. 7 and its related descriptions. More descriptions regarding the style identification module 4100 please refer to FIG. 8** and its related descriptions.

In some embodiments, when the training sample is input into the target model, a segmentation process may be performed by the segmentation module 4110 first. For example, the segmentation module 4110 may segment the sample text into one or more sub-segment sample text inputs and the sample emotion label into one or more sub-segment sample emotion labels based on a preset segmentation rule. Further, the segmented sub-segment sample text inputs may be input into the encoder 410 for subsequent processing, and the segmented sub-segment sample emotion labels may be input into the emotion embedding vector determination module 420 for subsequent processing. As another example, the segmentation module 4110 may segment the sample reference mel spectrum into one or more sub-segment sample reference mel spectrums based on the preset segmentation rule. Further, the segmented sub-segment sample reference mel spectrums may be input into the unsupervised module 430 and the emotion identification module 480 for subsequent processing. It should be noted that one sub-segment sample text corresponds to one sub-segment sample emotion label and one sub-segment sample reference mel spectrum. More descriptions regarding the segmentation of the training sample by the segmentation module 4110 and the processing performed by the target model on the segmented training sample please refer to FIG. **5*c***.

The above descriptions about the training process of the target model are merely provided for the purposes of illustration. In some embodiments, the training process of the target acoustic model may be more or fewer operations. For example, the operations of respectively processing the sample reference mel spectrum and the prediction mel spectrum by the emotion identification module 480 to obtain the prediction deep emotion feature corresponding to the prediction mel spectrum and the reference deep emotion feature corresponding to the sample reference mel spectrum may be combined into one operation to directly obtain the deep emotion feature including the prediction deep emotion feature and the reference deep emotion feature.

Figure 5C:
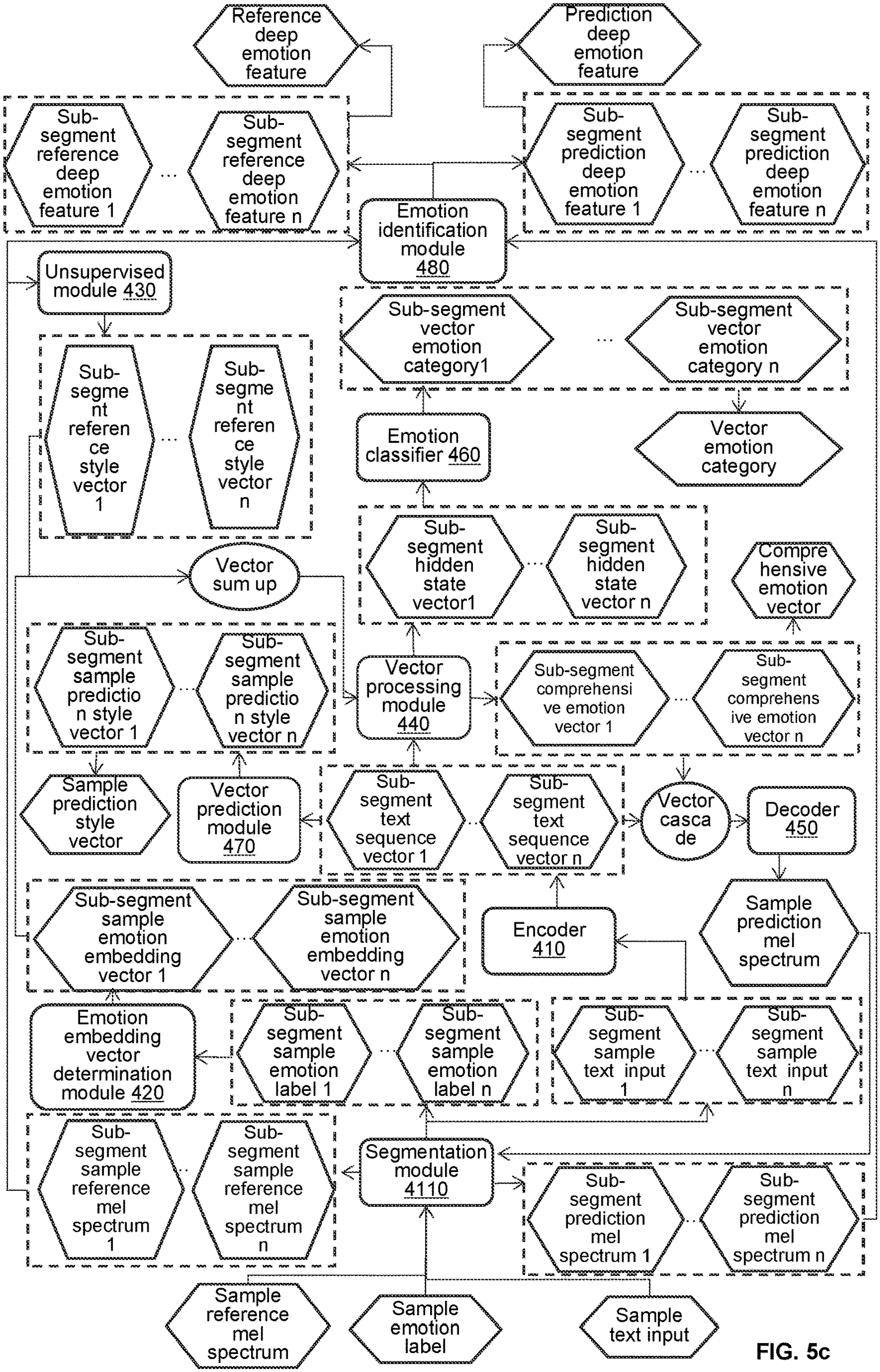

FIG. **5*c* is a schematic diagram illustrating an exemplary training process of an acoustic model according to some embodiments of the present disclosure. As shown in FIG. 5*c***, during training, an input of the target module may include the sample text input, the sample emotion label, and the sample reference mel spectrum.

After the training sample is input into the target model, the segmentation module 4110 may segment the sample text into one or more sub-segment sample text s, the sample emotion label into one or more sub-segment sample emotion labels, and the sample reference mel spectrum into one or more sub-segment sample reference mel spectrums based on the preset segmentation rule. One sub-segment sample text corresponds to one sub-segment sample emotion label and one sub-segment sample reference mel spectrum.

The encoder 410 may process the segmented sub-segment sample text inputs to obtain one or more sub-segment text sequence vectors corresponding to the sub-segment sample text inputs. In some embodiments, the encoder 410 may sequentially arrange the sub-segment text sequence vectors to obtain the text sequence vector corresponding to the sample text input.

The emotion embedding vector determination module 420 may determine one or more sub-segment sample emotion embedding vectors corresponding to the sub-segment sample emotion labels. The unsupervised module 430 may determine one or more sub-segment sample reference style vectors corresponding to the sub-segment sample reference mel spectrums.

In some embodiments, the target model may include a plurality of emotion embedding vector determination modules 420 each of which may process one sub-segment emotion label and determine the sub-segment sample emotion embedding vector corresponding to the sub-segment emotion label. In some embodiments, the unsupervised module 430 may include a plurality of reference style vector encoders each of which may process one sub-segment sample reference mel spectrum and determine the sub-segment corresponding to the sub-segment sample reference mel spectrum. More descriptions regarding the sub-segment sample emotion embedding vectors and the sub-segment sample reference style vectors please refer to FIG. 3 and its related descriptions.

The vector processing module 440 may determine a sub-segment comprehensive emotion vector corresponding to a sub-segment sample text input based on a sum of each sub-segment sample emotion embedding vector obtained by the emotion embedding vector determination module 420 and the corresponding sub-segment sample reference style vector obtained by the unsupervised module 430.

In some embodiments, the vector processing module 440 may arrange the sub-segment comprehensive emotion vectors corresponding to the sample text input in sequence to determine the comprehensive emotion vector corresponding to the sample text input. Further, the vector processing module 440 may determine one or more sub-segment hidden state vectors corresponding to the sub-segment comprehensive emotion vectors. In some embodiments, the vector processing module 440 may include an RNN.

The decoder 450 may generate a sample prediction mel spectrum based on a cascade vector of the text sequence vector obtained by the encoder 410 and the comprehensive emotion vector obtained by the vector processing module 440. Further, the segmentation module 4110 may segment the sample prediction mel spectrum into one or more sub-segment prediction mel spectrums based on the preset segmentation rule. The emotion identification module 480 may respectively process the sub-segment sample reference mel spectrums and the sub-segment prediction mel spectrums obtained by the segmentation module 4110 to obtain one or more sub-segment reference deep emotion features corresponding to the sub-segment sample reference mel spectrums and one or more sub-segment prediction deep emotion features corresponding to the sub-segment prediction mel spectrums.

In some embodiments, the emotion identification module 480 may sequentially arrange the sub-segment reference deep emotion features corresponding to the sample reference mel spectrum to obtain the reference deep emotion feature corresponding to the sample reference mel spectrum, and sequentially arrange the sub-segment prediction deep emotion features corresponding to the prediction mel spectrum to obtain the prediction deep emotion feature corresponding to the prediction mel spectrum. In some embodiments, internal parameters of the decoder 450 may be adjusted and/or updated based on a difference and/or a correlation between the prediction deep emotion feature and the reference deep emotion feature, so as to improve the ability of the target model to determine the prediction mel spectrum.

The emotion classifier 460 may determine one or more sub-segment vector emotion categories based on the sub-segment hidden state vectors output by the vector processing module 440. In some embodiments, internal parameters of the emotion embedding vector determination module 420, the vector processing module 440, and/or the emotion classifier 460 may be adjusted and/or updated based on a difference and/or a correlation between the vector emotion category and the sample emotion label, so as to improve the ability of the target model to determine the emotion representation.

The vector prediction module 470 may process the sub-segment text sequence vectors obtained by the encoder 410 to obtain one or more sub-segment prediction style vectors. In some embodiments, the vector prediction module 470 may arrange the sub-segment prediction style vectors corresponding to the sample text in order to obtain the sample prediction style vector corresponding to the sample text.

In some embodiments, internal parameters of the unsupervised module 430 and/or the vector prediction module 470 may be adjusted and/or updated based on a difference and/or a correlation between the sample prediction style vector and the sample reference style vector to improve the ability of the target model to determine the style.

A form of a loss target used when the internal parameters of each module of the target model are adjusted may be referred to in FIG. 3 and its related descriptions, which is not repeated herein.

In some embodiments, the emotion classifier 460 may include a linear classifier. In some embodiments, the vector prediction module 470 may include a combination of an RNN and a Linear, for example, a combination of a 1-layer RNN and a two-layer Linear.

It should be noted that the above descriptions about the training process of the target model are merely provided for the purposes of illustration. In some embodiments, the training processes of the target model may include more or fewer operations.

In the embodiments of the present disclosure, the training sample is segmented into sub-segment training samples by the segmentation model, and then the training of the target model is performed based on the sub-segment training samples, so that the acoustic model may be trained based on the emotion and style of each sub-segment, accordingly, the speech generated by the acoustic model may contain a variety of rich emotions and styles, which is more suitable for a real language emotion expression.

Figure 6A:
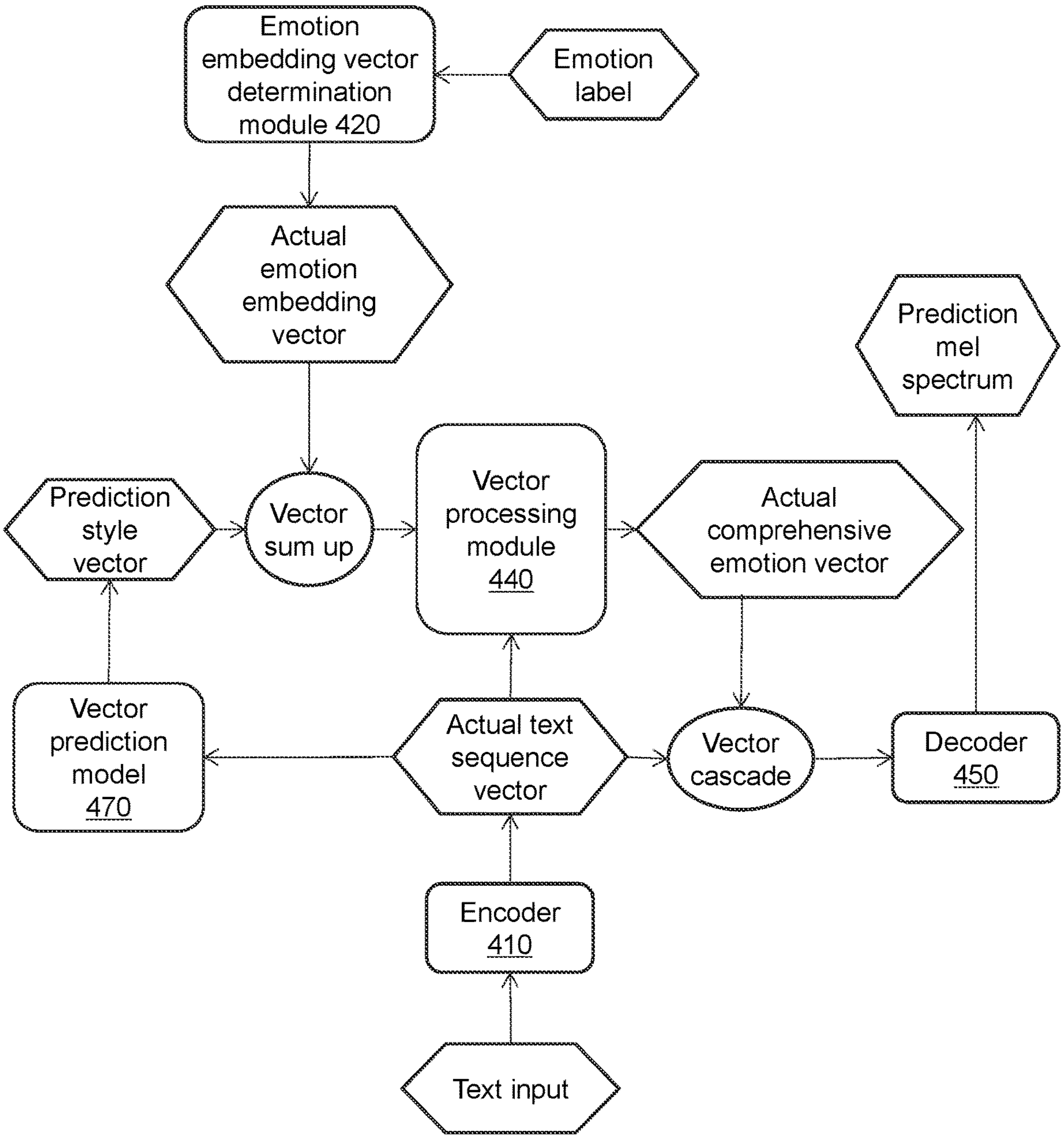
FIG. 6*a* and FIG. 6*b* are schematic diagrams each of which illustrates an exemplary process for determining a prediction mel spectrum using an acoustic model according to some embodiments of the present disclosure.
Figure 6B:
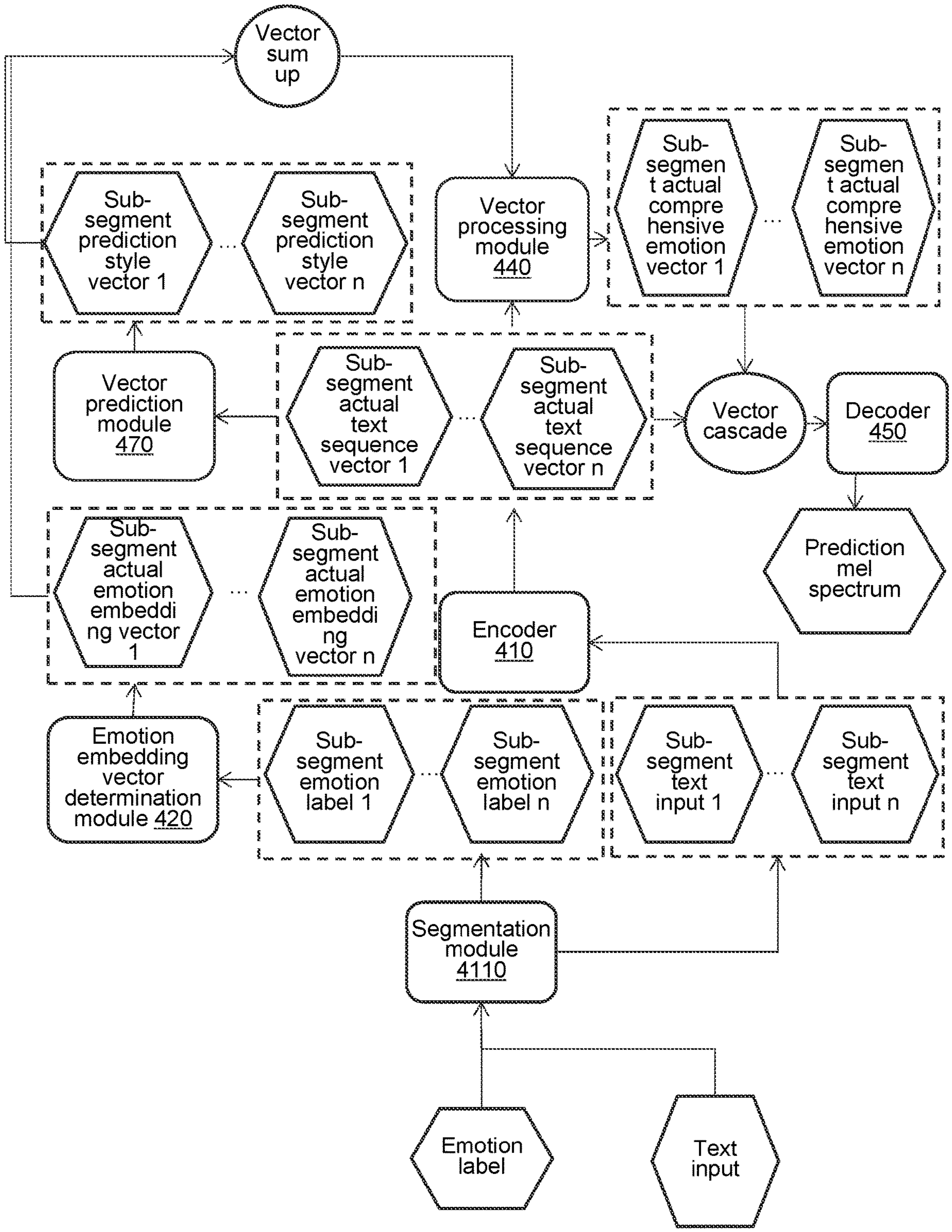

FIG. 6*a* and FIG. 6*b* are schematic diagrams each of which illustrates an exemplary process for determining a prediction mel spectrum using an acoustic model according to some embodiments of the present disclosure.

In combination with the above descriptions, after obtaining the trained acoustic model, each module of the trained acoustic model has mastered the corresponding data processing ability, so that the trained acoustic model may directly generate a prediction mel spectrum corresponding to a text input based on the text input and an emotion label corresponding to the text input.

It should be noted that, in some embodiments, the input of the trained acoustic model may only include the text input. In such cases, the trained acoustic model may process the text input to obtain the emotion label corresponding to the text input, and then obtain the prediction mel spectrum corresponding to the text input based on the text input and the corresponding emotion label.

Specifically, as shown in FIG. 6*a*, after the text input is input into the trained acoustic model, the encoder 410 may process the text input to obtain an actual text sequence vector corresponding to the text input. In addition, an actual emotion embedding vector corresponding to the emotion label may be determined by the emotion embedding vector determining module 420.

The vector prediction module 470 may process the actual text sequence vector to obtain the prediction style vector corresponding to the text input.

The vector processing module 440 may determine an actual comprehensive emotion vector corresponding to the text input based on the actual text sequence vector obtained by the encoder 410 and a sum of the prediction style vector and the actual emotion embedding vector.

Further, the decoder 450 may generate the prediction mel spectrum containing emotion information corresponding to the input text based on a cascade vector of the actual text sequence vector obtained by the encoder 410 and the actual comprehensive emotion vector obtained by the vector processing module 440.

After the prediction mel spectrum corresponding to the text input is obtained through the trained acoustic model, the prediction mel spectrum may be further processed through a vocoder to obtain a real, natural, and emotional prediction speech corresponding to the text input.

It may be seen that the input of the trained acoustic model is the text input and the emotion label, the output of the trained acoustic model is the prediction mel spectrum, and the overall structure of the trained acoustic model is end-to-end, which is simple and efficient.

As shown in FIG. 6*b*, in some embodiments, the trained auxiliary module of the trained target model includes the segmentation module 4110. Before the text is input into the trained acoustic model, the segmentation module 4110 may segment, based on the preset segmentation rule, the text input into one or more sub-segment text inputs and the sample emotion label into one or more sub-sub-segment emotion labels. Further, the segmentation module 4110 may input the one or more sub-segment text inputs into the encoder 410 of the trained acoustic model and input the one or more sub-segment emotion labels into the emotional embedding vector determination module 420 of the trained acoustic model.

The encoder 410 may process the sub-segment texts to obtain the corresponding sub-segment actual text sequence vectors. In addition, the sub-segment actual emotion embedding vectors corresponding to the sub-segment emotion labels may be determined by the emotion embedding vector determination module 420.

The vector prediction module 470 may process the sub-segment actual text sequence vectors to obtain the sub-segment prediction style vectors corresponding to the sub-segment text inputs.

The vector processing module 440 may determine a sub-segment actual comprehensive emotion vector corresponding to a sub-segment text input based on a sum of each sub-segment prediction style vector and the corresponding sub-segment actual emotion embedding vector as well as the corresponding sub-segment actual text sequence vector obtained by the encoder 410.

Further, the decoder 450 may generate the prediction mel spectrum containing emotion information corresponding to the sub-segment text inputs based on the cascade vector of the sub-segment actual text sequence vectors obtained by the encoder 410 and the sub-segment actual comprehensive emotion vectors obtained by the vector processing module 440.

After the prediction mel spectrum corresponding to the text input is obtained through the trained acoustic model, the prediction mel spectrum may be further processed through the vocoder to obtain the real, natural, and emotional prediction speech corresponding to the text input.

Figure 7:
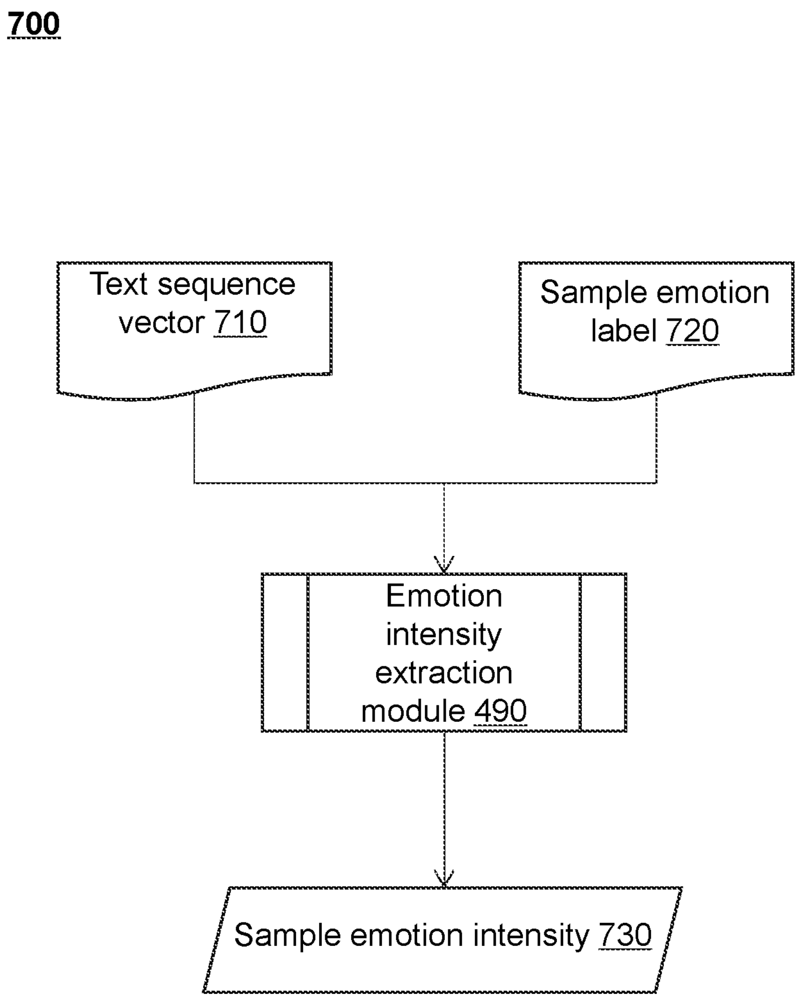
FIG. 7 is a schematic diagram illustrating an exemplary emotion intensity extraction module according to some embodiments of the present disclosure.

FIG. 7 is a schematic diagram illustrating an exemplary emotion intensity extraction module according to some embodiments of the present disclosure.

In some embodiments, the auxiliary module may include the emotion intensity extraction module 490. The emotion intensity extraction module 490 may be a machine learning model. The emotion intensity extraction module 490 may be configured to determine a sample emotion intensity corresponding to a sample text input based on a text sequence vector of the sample text input and a sample emotion label corresponding to the sample text input.

In some embodiments, the emotion intensity extraction module 490 may be a machine learning model for determining the sample emotion intensity. For example, the emotion intensity extraction module 490 may be a neural network model (NN), a deep neural network (DNN), a convolutional neural network (CNN), a recurrent neural network (RNN), or the like, or any combination thereof.

In some embodiments, an input of the emotion intensity extraction module 490 may include a text sequence vector 710 and a sample emotion label 720, and an output of the emotion intensity extraction module 490 may include a sample emotion intensity 730.

For example, a tensor V_t of a text sequence vector [N, T, 512] and an emotion label (1, 20%; 4, 45%; 6, 35%) may be input into the emotion intensity extraction module 490, wherein N in the text sequence vector indicates a number of samples of a single training, T indicates a corresponding time series length, the tensor may indicate a multidimensional vector or a multidimensional array, 512 indicates 512 dimensions, (1, 20%) in the emotion label indicates that the neutral emotion accounts for 20%, (4, 45%) indicates that the angry emotion accounts for 40%, and (6, 35%) indicates that the disgust emotion accounts for 35%. The emotion intensity extraction module 490 may output a sample emotion intensity (1, 2; 4, 5; 6, 4), wherein (1, 2) indicates that the intensity of the neutral emotion is 2, (4, 5) indicates that the intensity of anger emotion is and (6, 4) indicates that the intensity of disgust emotion is 4. More descriptions regarding the text sequence vector and the sample emotion label please refer to FIG. 2 and its related descriptions. More descriptions regarding the sample emotion intensity please refer to FIG. 3 and its related descriptions.

In some embodiments, the emotion intensity extraction module 490 may be trained by a plurality of first training samples each of which has a label. Each of the plurality of first training samples may be input into an initial emotion intensity extraction module, a loss function is constructed through the label of the first training sample and an output result of the initial emotion intensity extraction module, and parameters of the initial emotion intensity extraction module are iteratively updated based on the loss function. When the loss function of the initial emotion intensity extraction module satisfies a preset condition, the module training is completed, and a trained emotion intensity extraction module is obtained. The preset condition may be one or more of a convergence of the loss function, a number of iterations reaching a threshold, etc.

In some embodiments, a first training sample may include a sample text sequence vector and a sample emotion label corresponding to a sample text input, and the label of the first training sample may be an actual emotion intensity corresponding to the sample text input. In some embodiments, the plurality of first training samples may be obtained based on historical data. The labels of the plurality of first training samples may be obtained through manual labeling.

According to the embodiments of the present disclosure, the sample emotion intensity corresponding to the sample text input is accurately determined using the emotion intensity extraction module by a comprehensive consideration of various information such as the text sequence vector, the sample emotion label, etc., thereby reducing a time cost and a waste of resources required for manual evaluation of the emotion intensity and reducing an error caused by subjective factors affecting the results of the manual evaluation.

Figure 8:
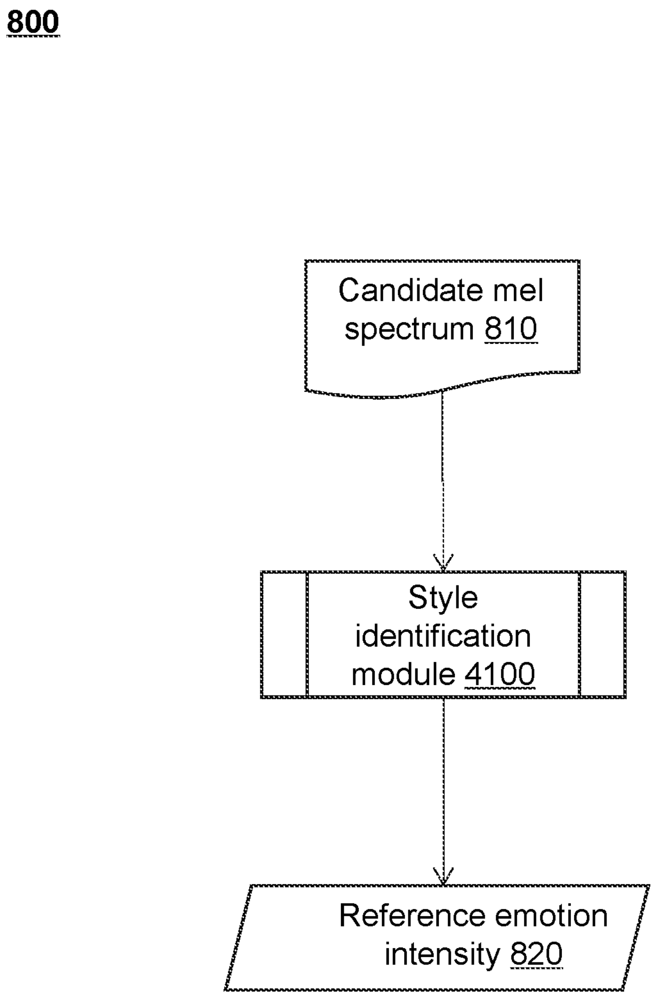
FIG. 8 is a schematic diagram illustrating an exemplary style identification module according to some embodiments of the present disclosure.

FIG. 8 is a schematic diagram illustrating an exemplary style identification module according to some embodiments of the present disclosure.

In some embodiments, the acoustic model may include the style identification module 4100. The style identification module 4100 may be a machine learning model. The style identification module 4100 may be configured to determine a reference emotion intensity corresponding to a candidate mel spectrum based on the candidate mel spectrum.

In some embodiments, the style identification module 4100 may be a machine learning model for determining the reference emotion intensity corresponding to the candidate mel spectrum. For example, the style identification module 4100 may be a neural network model (NN), a deep neural network (DNN), a convolutional neural network (CNN), a recurrent neural network (RNN), or the like, or any combination thereof.

In some embodiments, an input of the style identification module 4100 may include a candidate mel spectrum 810 and an output of the style identification module 4100 may include a reference emotion intensity 820.

For example, a candidate mel spectrum corresponding to a certain text input to be processed may be input into the style identification module 4100, and the style identification module 4100 may output a reference emotion intensity (1, 3; 4, 4; 6, 4), wherein (1, 3) indicates that the neutral emotion intensity in the text input is level 3, (4, 4) indicates that the angry emotion intensity in the text input is level 4, (6, 4) indicates that the disgust emotion intensity in the text input is level 4. More descriptions regarding the candidate mel spectrum and the reference emotion intensity may be found in FIG. 3 and its related descriptions.

In some embodiments, the style identification module 4100 may be trained by a plurality of second training samples each of which has a label. Each of the plurality of labeled second training samples may be input into an initial style identification module, a loss function is constructed through the label of the second training sample and an output result of the initial style identification module, and parameters of the initial style identification module are iteratively updated based on the loss function. When the loss function of the initial style identification module satisfies a preset condition, the module training is completed, and the trained style identification module is obtained. The preset condition may be one or more of a convergence of the loss function, a number of iterations reaching a threshold, etc.

In some embodiments, a second training sample may include a sample mel spectrum corresponding to a sample text input, and the label of the second training sample may be an actual emotion intensity corresponding to the sample text input. In some embodiments, the plurality of second training samples may be obtained based on the historical data. The labels of the plurality of second training samples may be obtained through manual labeling.

According to the embodiments of the present disclosure, the reference emotion intensity corresponding to the candidate mel spectrum is accurately determined using the style identification module, thereby reducing a time cost and a waste of resources required for manual evaluation of the emotion intensity, and reducing an error caused by subjective factors affecting the results of the manual evaluation.

Figure 9:
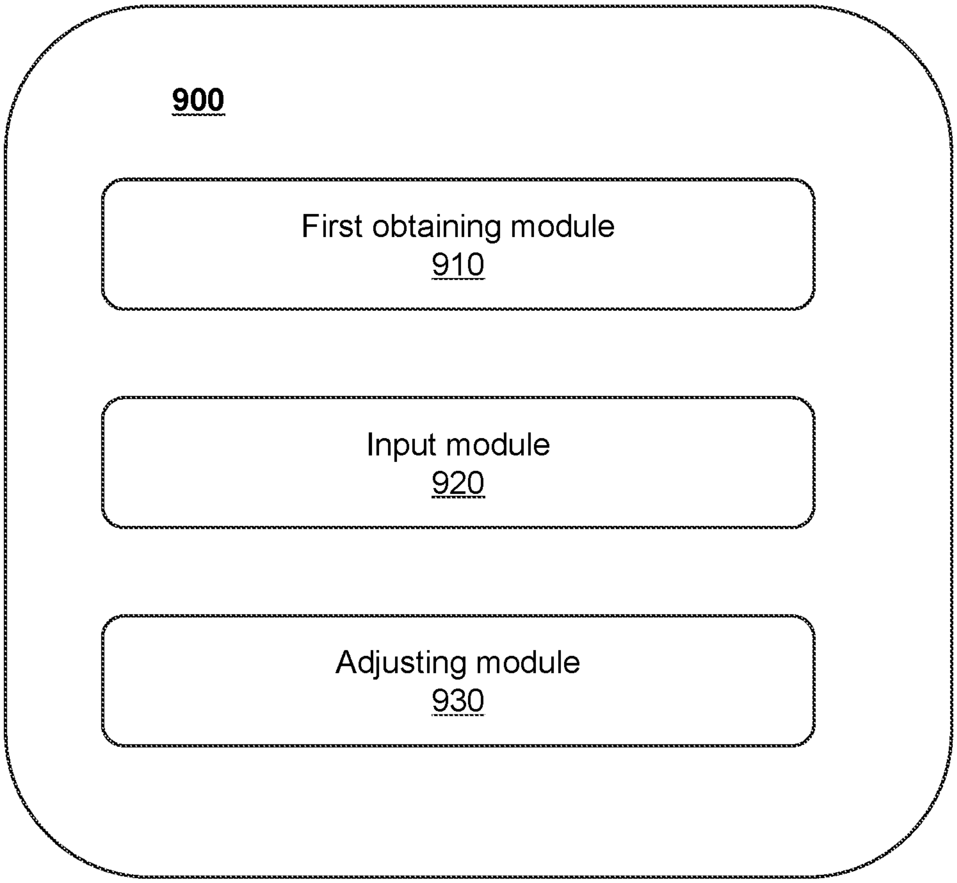
FIG. 9 is a schematic diagram illustrating an exemplary acoustic module training system according to some embodiments of the present disclosure.

FIG. 9 is a schematic diagram illustrating an exemplary acoustic module training system according to some embodiments of the present disclosure. In some embodiments, an acoustic module training system 900 may include a first obtaining module 910, an input module 920, and an adjustment module 930.

The first obtaining module 910 may be configured to obtain a plurality of training samples. Each of the plurality of training samples includes a sample text input, a sample emotion label corresponding to the sample text input, and a sample reference mel spectrum corresponding to the sample text input.

The input module 920 may be configured to input the plurality of training samples into a target model. The target model includes an acoustic model and an auxiliary module.

The adjustment module 930 may be configured to iteratively adjust at least one model parameter of the acoustic model based on a loss target.

More descriptions regarding the first obtaining module 910, the input module 920, and the adjustment module 930 please refer to FIGS. 2-8 and their related descriptions.

It should be understood that the system and its modules shown in FIG. 9 may be implemented in various ways. For example, in some embodiments, the system and its modules thereof may be implemented by hardware, software, or a combination of software and hardware. The hardware may be implemented by a specific logic. The software may be stored in a storage and executed by an appropriate instruction execution system, such as a microprocessor or a dedicated design hardware. Those skilled in the art may understand that the above methods and systems may be implemented using computer-executable instructions and/or control codes contained in a processor.

It should be noted that the above descriptions of the acoustic module training system and its modules are merely provided for the purposes of illustration, and are not intended to limit the scope of the present disclosure. It will be understood that for those skilled in the art, after understanding the principle of the system, without departing from this principle, it is possible to arbitrarily combine various modules, or form subsystems, or connect with other modules. In some embodiments, the first obtaining module 910, the input module 920, and the adjustment module 930 in FIG. 9 may be different modules in one system, or one module may implement the functions of the above-mentioned two or more modules. For example, multiple modules may share a storage module, or each module may have its own storage module. Those variations and modifications may be within the scope of the embodiments of the present disclosure.

Figure 10:
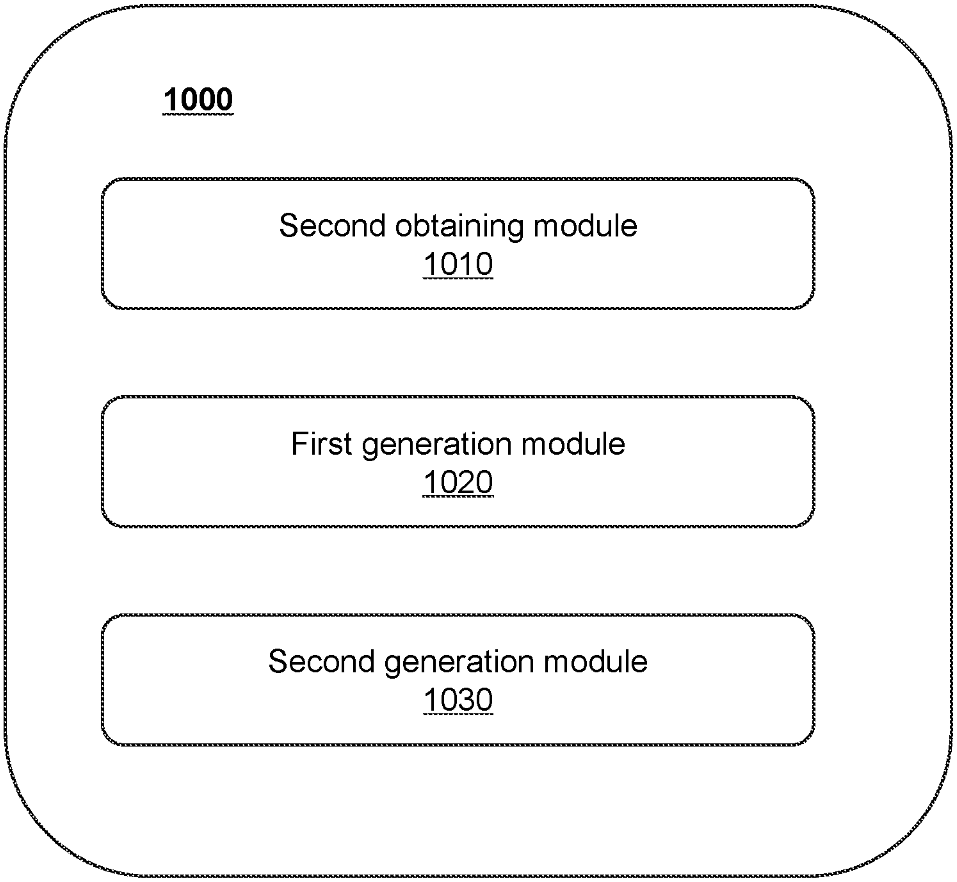
FIG. 10 is a schematic diagram illustrating an exemplary speech synthesis system according to some embodiments of the present disclosure.

FIG. 10 is a schematic diagram illustrating an exemplary speech synthesis system according to some embodiments of the present disclosure. In some embodiments, a speech synthesis system 1000 may include a second obtaining module 1010, a first generation module 1020, and a second generation module 1030. The second obtaining module 1010 may be configured to obtain a text input and an emotion label corresponding to the text input.

The first generation module 1020 may be configured to generate a prediction mel spectrum corresponding to the text input based on the text input and the emotion label by an acoustic model.

The second generation module 1030 may be configured to generate a prediction speech corresponding to the text input based on the prediction mel spectrum.

More descriptions regarding the second obtaining module 1010, the first generation module 1020, and the second generation module 1030 please refer to FIGS. 2-8 and their related descriptions.

It should be understood that the system and its modules shown in FIG. 10 may be implemented in various ways. For example, in some embodiments, the system and its modules thereof may be implemented by hardware, software, or a combination of software and hardware. The hardware may be implemented by a specific logic. The software may be stored in a storage and executed by an appropriate instruction execution system, such as a microprocessor or a dedicated design hardware. Those skilled in the art may understand that the above methods and systems may be implemented using a computer-executable instructions and/or control codes contained in a processor.

It should be noted that the above descriptions of the speech synthesis system and its modules are merely provided for the purposes of illustration, and are not intended to limit the scope of the present disclosure. It will be understood that for those skilled in the art, after understanding the principle of the system, without departing from this principle, it is possible to arbitrarily combine various modules, or form subsystems, or connect with other modules. In some embodiments, the second obtaining module 1010, the first generation module 1020, and the second generation module 1030 in FIG. 10 may be different modules in one system, or one module may implement the functions of the above-mentioned two or more modules. For example, multiple modules may share a storage module, or each module may have its own storage module. Those variations and modifications may be within the scope of the embodiments of the present disclosure.

The embodiments of the present disclosure further provide an acoustic module training device/system. The acoustic module training device/system includes at least one computer-readable storage medium including a set of instructions and at least one processing device communicating with the computer-readable storage medium. When executing the set of instructions, the at least one processing device is configured to implement the acoustic model training method/process described in the present disclosure.

The embodiments of the present disclosure further provide a speech synthesis device/system. The speech synthesis device/system includes at least one computer-readable storage medium including a set of instructions and at least one processing device communicating with the computer-readable storage medium. When executing the set of instructions, the at least one processing device is configured to implement the speech synthesis method/process described in the present disclosure.

Possible beneficial effects of the embodiments of the present disclosure include but are not limited to: (1) the sample emotion embedding vector is determined based on a supervised manner, and the sample reference style vector is determined based on an unsupervised manner, so that due to the combination of the supervised and the unsupervised manners, the synthesized speech is obtained by subsequent processing may be more realistic, natural, and emotional; (2) the character-level emotion embedding vector is introduced to solve the problem of coarser style embedding granularity of the sentence-level embedding vector and better reflect style changes of different words or characters in a sentence; (3) an emotion classifier is introduced to constrain the character-level comprehensive emotion vector generated by the vector processing module, which strengthens the emotion expression and avoids the emotion of the synthesized speech from being unclear; (4) the acoustic model is trained based on a multidimensional loss target, so that the trained acoustic model may process the input text more accurately and the emotion information of the output of the trained acoustic model is richer; (5) the acoustic model is trained by modeling in an end-to-end manner, so that a training deployment may be simple and efficient.

It should be noted that the beneficial effects of different embodiments may be different. In various embodiments, the possible beneficial effects may be one or more of the above beneficial effects, or any other possible effects.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" may mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for training an acoustic model, comprising:

obtaining a plurality of training samples, each of the plurality of training samples including a sample text input, a sample emotion label corresponding to the sample text input, and a sample reference mel spectrum corresponding to the sample text input;

inputting the plurality of training samples into a target model, the target model including the acoustic model and an auxiliary module; and determining, by the target model, a text sequence vector of the sample text input;

determining, by the target model, a sample prediction style vector by processing the text sequence vector;

iteratively adjusting at least one model parameter of the acoustic model based on a loss target, wherein the sample reference mel spectrum is a ground truth used to determine the loss target, and the sample reference mel spectrum refers to a mel spectrum of a real speech or a standard speech corresponding to the sample text input wherein the sample reference mel spectrum is obtained by:

obtaining a plurality of speech samples of the sample text input, the plurality of speech samples being speech data recorded with various timbres and emotion intensities for the sample text input;

obtaining a candidate mel spectrum of each of the plurality of speech samples;

for each candidate mel spectrum, determining a reference emotion intensity based on the each candidate mel spectrum, the reference emotion intensity referring to a parameter used to evaluate an emotion style and an intensity of an emotion expressed by the speech sample corresponding to the each candidate mel spectrum;

determining a sample emotion intensity corresponding to the sample text input based on the text sequence vector of the sample text input and the sample emotion label corresponding to the sample text input, the sample emotion intensity referring to a parameter used to evaluate an emotion style and an intensity of an emotion expressed by the sample text input; and selecting, as the sample reference mel spectrum, one of the candidate mel spectrums of the plurality of speech samples based on the sample emotion intensity and the reference emotion intensity of each candidate mel spectrum, the reference emotion intensity of the selected one of the candidate mel spectrums being the same as the sample emotion intensity, or closest to the sample emotion intensity among the reference emotion intensities of the candidate mel spectrums of the plurality of speech samples.

2. The method of claim 1, wherein:

the acoustic model comprises:

an encoder configured to determine the text sequence vector of the sample text input; and an emotion embedding vector determination module configured to determine a sample emotion embedding vector corresponding to the sample emotion label;

the auxiliary module comprises:

an unsupervised module configured to determine a sample reference style vector corresponding to the sample reference mel spectrum.

3. The method of claim 2, wherein the acoustic model further comprises:

a vector processing module configured to determine a comprehensive emotion vector based on a sum of the sample emotion embedding vector and the sample reference style vector, wherein the comprehensive emotion vector is a character-level embedding vector.

4. The method of claim 3, wherein the acoustic model further comprises:

a decoder configured to determine a sample prediction mel spectrum based on a cascade vector of the text sequence vector and the comprehensive emotion vector.

5. The method of claim 4, wherein the vector processing module is further configured to determine a hidden state vector that refers to a low-dimensional dense embedding vector related to the comprehensive emotion vector, and the auxiliary module further comprises an emotion classifier configured to determine a vector emotion category based on the hidden state vector.

6. The method of claim 4, wherein the auxiliary module further comprises an emotion identification module configured to determine a prediction deep emotion feature corresponding to the sample prediction mel spectrum and a reference deep emotion feature corresponding to the sample reference mel spectrum, and the loss target includes a difference loss between the prediction deep emotion feature and the reference deep emotion feature; or the loss target includes a difference loss between the sample prediction mel spectrum and the sample reference mel spectrum.

7. A system for training an acoustic model, comprising:

at least one computer-readable storage medium including a set of instructions; and at least one processing device communicating with the computer-readable storage medium, wherein when executing the set of instructions, the at least one processing device is configured to:

obtain a plurality of training samples, each of the plurality of training samples including a sample text input, a sample emotion label corresponding to the sample text input, and a sample reference mel spectrum corresponding to the sample text input;

input the plurality of training samples into a target model, the target model including the acoustic model and an auxiliary module;

determine, by the target model, a sample reference style vector corresponding to the sample reference mel spectrum, including:

segmenting the sample reference mel spectrum into sub-segment sample reference mel spectrums each of which corresponds to a sub-segment sample text input of the sample text input;

determining a sub-segment sample reference style vector of each sub-segment sample reference mel spectrum by processing the each sub-segment sample reference mel spectrum, the sub-segment sample reference style vector including a sub-segment sample reference style feature and a sample reference style relationship feature, the sub-segment sample reference style feature referring to a vector representing an emotion style of the sub-segment sample text input corresponding to the each sub-segment sample reference mel spectrum, the sample reference style relationship feature referring to a vector representing a relationship between the sub-segment sample text input and the sub-segment sample reference style vectors of previous and subsequent sub-segment sample text inputs; and obtaining the sample reference style vector by arranging the sub-segment sample reference style vectors in order; and iteratively adjust at least one model parameter of the acoustic model based on a loss target, the loss target being determined based on the sample reference style vector.

8. The system of claim 7, wherein: the acoustic model comprises:

an encoder configured to determine a text sequence vector of the sample text input; and an emotion embedding vector determination module configured to determine a ample emotion embedding vector corresponding to the sample emotion label;

a vector processing module configured to determine a comprehensive emotion vector based on a sum of the sample emotion embedding vector and the sample reference style vector, wherein the comprehensive emotion vector is a character-level embedding vector;

a decoder configured to determine a sample prediction mel spectrum based on a cascade vector of the text sequence vector and the comprehensive emotion vector;

the auxiliary module comprises:

an unsupervised module configured to determine the sample reference style vector corresponding to the sample reference mel spectrum.

9. The system of claim 8, wherein the vector processing module is further configured to determine a hidden state vector, the acoustic model further comprises a vector prediction module configured to determine a sample prediction style vector based on the text sequence vector, and the auxiliary module further comprises an emotion classifier configured to determine a vector emotion category based on the hidden state vector, and an emotion identification module configured to determine a prediction deep emotion feature corresponding to the sample prediction mel spectrum and a reference deep emotion feature corresponding to the sample reference mel spectrum.

10. The system of claim 9, wherein the loss target comprises at least one of the following:

a difference loss between the sample prediction style vector and the sample reference style vector;

a classification loss of the vector emotion category;

a difference loss between the sample prediction mel spectrum and the sample reference mel spectrum; or a difference loss between the prediction deep emotion feature and the reference deep emotion feature.

11. A speech synthesis method, comprising:

obtaining a text input and an emotion label corresponding to the text input;

generating, by an acoustic model, a prediction mel spectrum corresponding to the text input based on the text input and the emotion label, and generating a prediction speech corresponding to the text input based on the prediction mel spectrum, wherein the acoustic model has been trained, and a training of the acoustic model comprises:

obtaining a plurality of training samples, each of the plurality of training samples including a sample text input, a sample emotion label corresponding to the sample text input, and a sample reference mel spectrum corresponding to the sample text input;

inputting the plurality of training samples into a target model, the target model including the acoustic model and an auxiliary module; and iteratively adjusting at least one model parameter of the acoustic model based on a loss target, the sample reference mel spectrum being a ground truth used to determine the loss target;

the acoustic model comprises:

an encoder configured to determine a text sequence vector of the sample text input;

an emotion embedding vector determination module configured to determine a sample emotion embedding vector corresponding to the sample emotion label;

a vector processing module configured to determine a comprehensive emotion vector based on a sum of the sample emotion embedding vector and a sample reference style vector; and the auxiliary module comprises:

an unsupervised module configured to determine the sample reference style vector corresponding to the sample reference mel spectrum;

wherein the vector processing module is further configured to determine a hidden state vector, the hidden state vector referring to a low-dimensional dense embedding vector related to the comprehensive emotion vector;

the auxiliary module further comprises an emotion classifier configured to determine a vector emotion category based on the hidden state vector; and a difference loss between the vector emotion category and the sample emotion label is a loss term of the loss target.

12. The speech synthesis method of claim 11, further comprising:

generating an actual text sequence vector corresponding to the text input based on the text input;

generating an actual emotion embedding vector corresponding to the emotion label based on the emotion label:

generating a prediction style vector corresponding to the text input by processing the actual text sequence vector; and generating the prediction mel spectrum corresponding to the text input based on the actual text sequence vector, the actual emotion embedding vector, and the prediction style vector;

wherein the acoustic model further comprises a vector prediction module, and the generating, by the acoustic model, the prediction mel spectrum corresponding to the text input based on the text input and the emotion label comprises:

determining, by the vector processing module, an actual comprehensive emotion vector corresponding to the text input based on the actual text sequence vector and a sum of the prediction style vector and the actual emotion embedding vector; and generating, by the decoder, the prediction mel spectrum corresponding to the text input based on an actual cascade vector of the actual comprehensive emotion vector and the actual text sequence vector.

13. The speech synthesis method of claim 11, wherein the acoustic model further comprises:

a decoder configured to determine a sample prediction mel spectrum based on a cascade vector of the text sequence vector and the comprehensive emotion vector:

a vector prediction module configured to determine a sample prediction style vector based on the text sequence vector; and an emotion identification module configured to determine a prediction deep emotion feature corresponding to the sample prediction mel spectrum and a reference deep emotion feature corresponding to the sample reference mel spectrum.

14. The speech synthesis method of claim 13, wherein the loss target is a sum of the difference loss between the vector emotion category and the sample emotion label, and at least one of the following:

a difference loss between the sample prediction style vector and the sample reference style vector;

a difference loss between the sample prediction mel spectrum and the sample reference mel spectrum; or a difference loss of the prediction deep emotion feature and the reference deep emotion feature.

15. The method of claim 5, wherein the loss target further includes a difference loss between the vector emotion category and the sample emotion label.

16. The method of claim 6, wherein the emotion identification module includes at least one of a bidirectional gated recurrent unit, a pooling layer, or a linear layer, and a feature of a preset dimension after the pooling layer is used as a deep feature.

17. The method of claim 1, wherein the auxiliary module includes:

an emotion intensity extraction module that is a machine learning model configured to determine the sample emotion intensity; and a style identification module that is a machine learning model configured to determine the reference emotion intensity.

18. The system of claim 10, wherein the classification loss is a difference loss between the vector emotion category and the sample emotion label.

19. The system of claim 18, wherein the difference loss between the vector emotion category and the sample emotion label is a loss term of the loss target.

20. The system of claim 19, wherein the loss target is a sum of the difference loss between the vector emotion category and the sample emotion label, and at least one of the following:

the difference loss between the sample prediction style vector and the sample reference style vector;

the difference loss between the sample prediction mel spectrum and the sample reference mel spectrum; or the difference loss of the prediction deep emotion feature and the reference deep emotion feature.

* * * * *